United States Patent
Im et al.

(10) Patent No.: US 11,506,570 B2
(45) Date of Patent: *Nov. 22, 2022

(54) METHOD FOR SENSING DAMAGE OF BEARING OF ENGINE USING VIBRATION SIGNAL

(71) Applicants: HYUNDAI MOTOR COMPANY, Seoul (KR); KIA MOTORS CORPORATION, Seoul (KR)

(72) Inventors: Hyuk Im, Suwon-si (KR); Dong-Chune Hong, Seongnami-si (KR); Jin-Kwon Kim, Seoul (KR); Dae-Woon Kim, Anyang-si (KR); Jun-ho Park, Seoul (KR); Il-Joong Hwang, Hwaseong-si (KR); Hong-Wook Lee, Seongnam-si (KR); Hyun-Jun Lim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 469 days.

This patent is subject to a terminal disclaimer.

(21) Appl. No.: 16/548,038

(22) Filed: Aug. 22, 2019

(65) Prior Publication Data
US 2020/0064227 A1 Feb. 27, 2020

(30) Foreign Application Priority Data

Aug. 27, 2018 (KR) .................. 10-2018-0100514
Jun. 25, 2019 (KR) .................. 10-2019-0075915

(51) Int. Cl.
G01M 15/12 (2006.01)
G01M 13/045 (2019.01)
(Continued)

(52) U.S. Cl.
CPC .......... G01M 13/045 (2013.01); G01M 15/02 (2013.01); G01M 15/12 (2013.01); G07C 5/0808 (2013.01); F16C 2233/00 (2013.01)

(58) Field of Classification Search
CPC .... G01M 13/045; G01M 15/02; G01M 15/12; G07C 5/0808; F16C 2233/00;
(Continued)

(56) References Cited

U.S. PATENT DOCUMENTS 9,803,567 B2 * 10/2017 Bizub .................. F02D 35/027
2012/0150414 A1 * 6/2012 Huang .................. F02D 41/28
701/101

(Continued)

FOREIGN PATENT DOCUMENTS

CA 2260695 A1 * 8/2000 ............ G01M 15/12
JP 4117500 B 8/2007
(Continued)

*Primary Examiner* — Alexander A Mercado
(74) *Attorney, Agent, or Firm* — Fox Rothschild LLP

(57) ABSTRACT

A method for sensing damage of bearing of engine using a vibration signal may include separating a vibration signal of an engine sensed by a vibration sensor installed at one side of the engine of a vehicle into a vibration signal by combustion knocking and a vibration signal of a bearing installed between a crank pin and a connecting rod; extracting, by a signal processing filter, a signal of a predetermined natural frequency band from the vibration signal of the bearing; determining whether the vibration signal of the bearing is higher than a predetermined bearing damage threshold, in a predetermined engine state condition in order to sense breakage of the bearing during operation of the engine; and confirming that the bearing has been damaged.

20 Claims, 21 Drawing Sheets

(51) Int. Cl.
*G07C 5/08* (2006.01)
*G01M 15/02* (2006.01)

(58) Field of Classification Search
CPC .......... F01D 2041/281; F01D 2250/14; F01D 35/027; F01D 41/22
See application file for complete search history.

(56) References Cited

U.S. PATENT DOCUMENTS

| | | | |
|---|---|---|---|
| 2014/0331753 A1* | 11/2014 | Wiebrecht | F16C 9/02 123/434 |
| 2018/0030890 A1* | 2/2018 | Roe | F02D 35/025 |
| 2018/0298744 A1* | 10/2018 | Ebrahimi | E21B 47/009 |
| 2019/0112952 A1* | 4/2019 | Bong | F01L 1/047 |
| 2020/0063668 A1* | 2/2020 | Jeong | F02D 35/027 |
| 2020/0064225 A1* | 2/2020 | Im | F01M 1/06 |
| 2020/0064227 A1* | 2/2020 | Im | G07C 5/0808 |

FOREIGN PATENT DOCUMENTS

| | | |
|---|---|---|
| JP | 2009-030470 A | 2/2009 |
| KR | 10-2007-0012680 A | 1/2007 |
| KR | 10-2010-0062421 A | 6/2010 |
| KR | 10-1482509 B | 1/2015 |
| KR | 10-2019-0042849 A | 4/2019 |

* cited by examiner

<NORMAL ENGINE>

<ENGINE WITH BEARING DAMAGED>

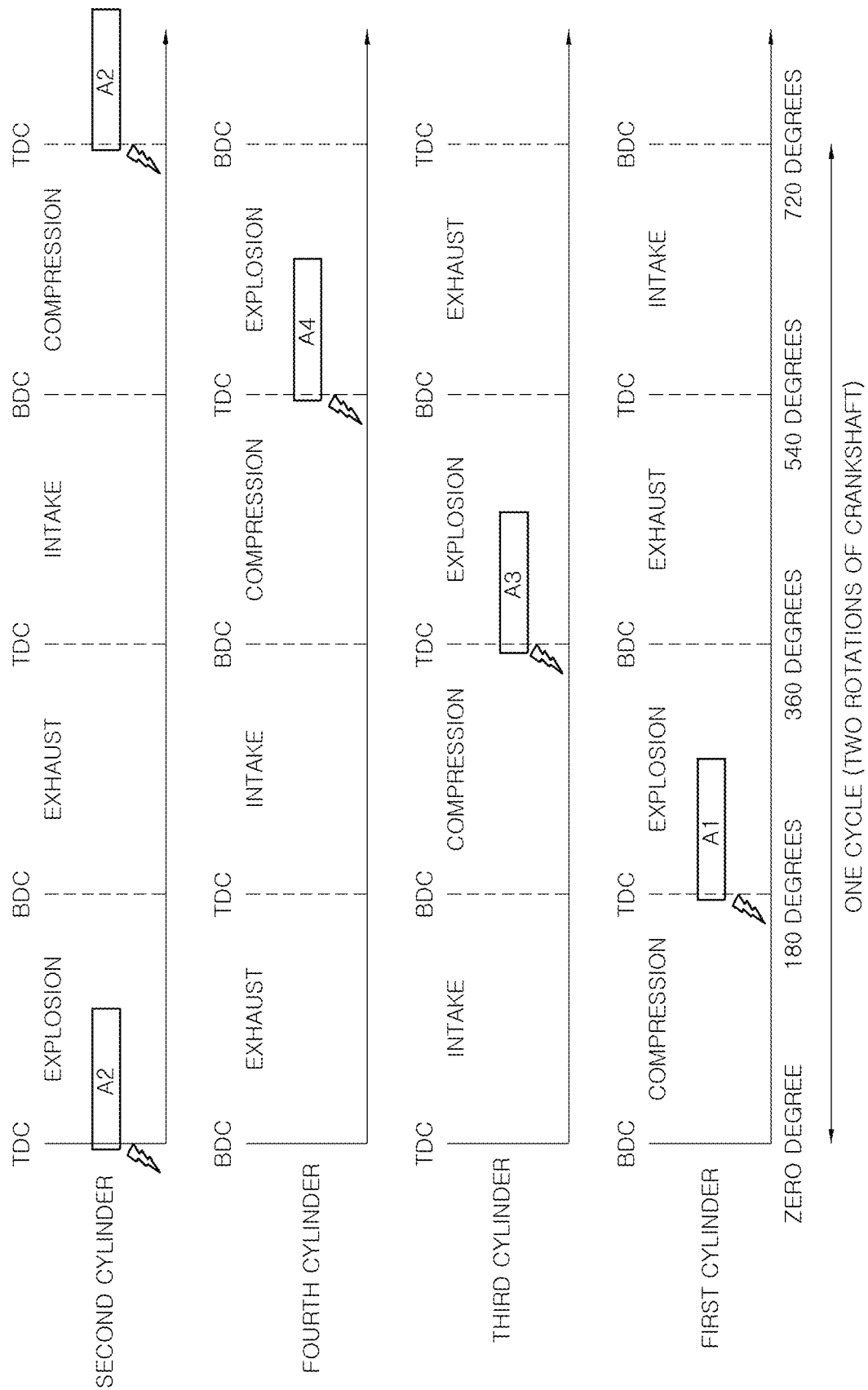

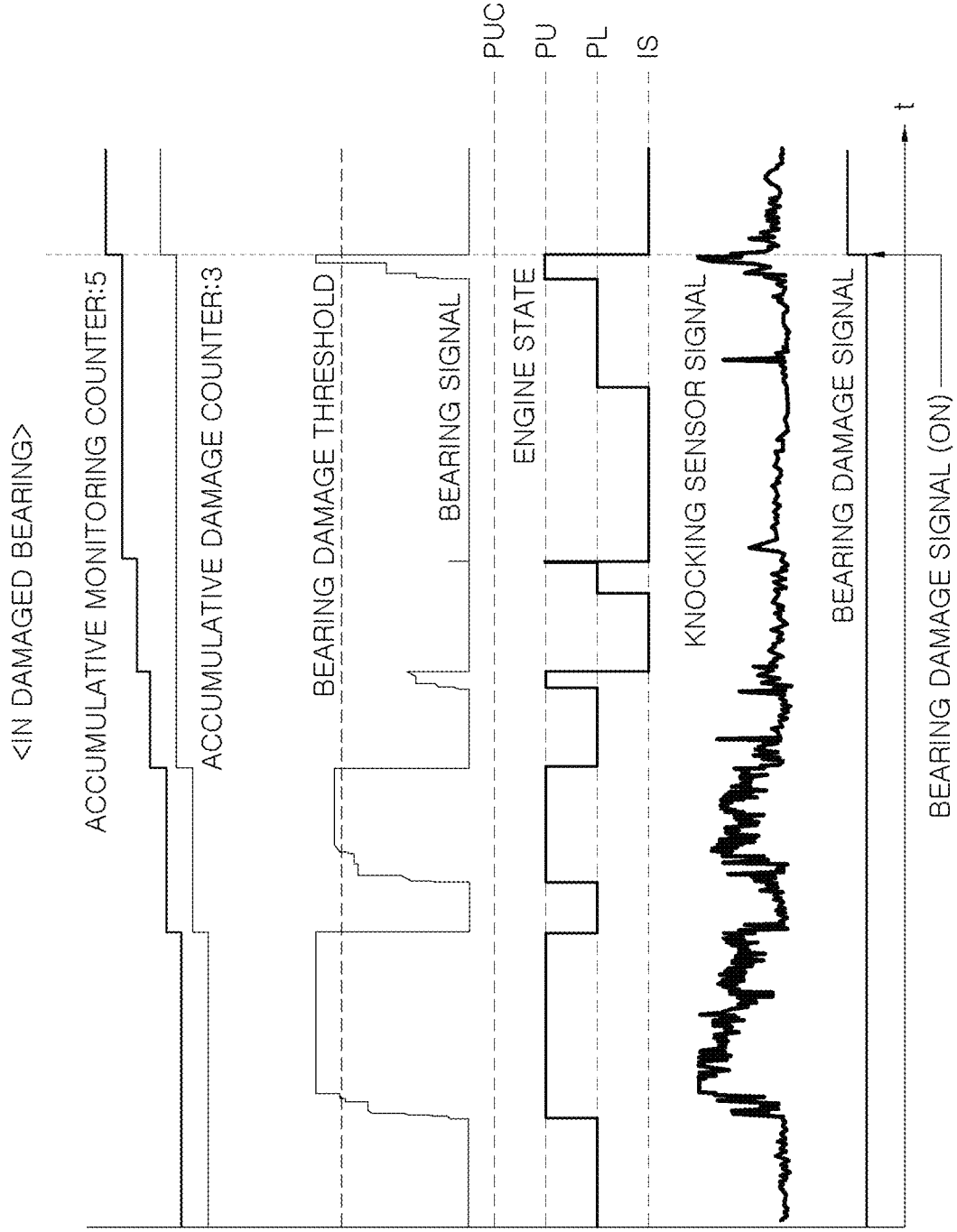

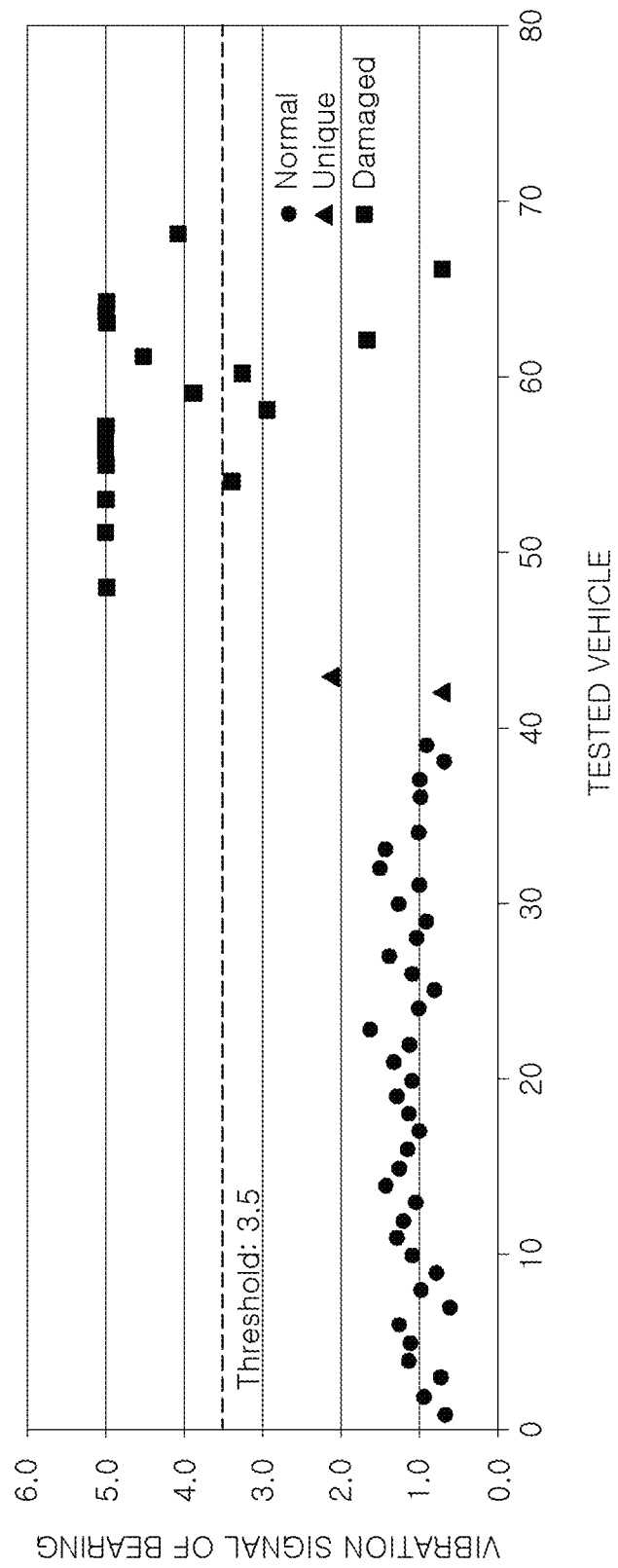

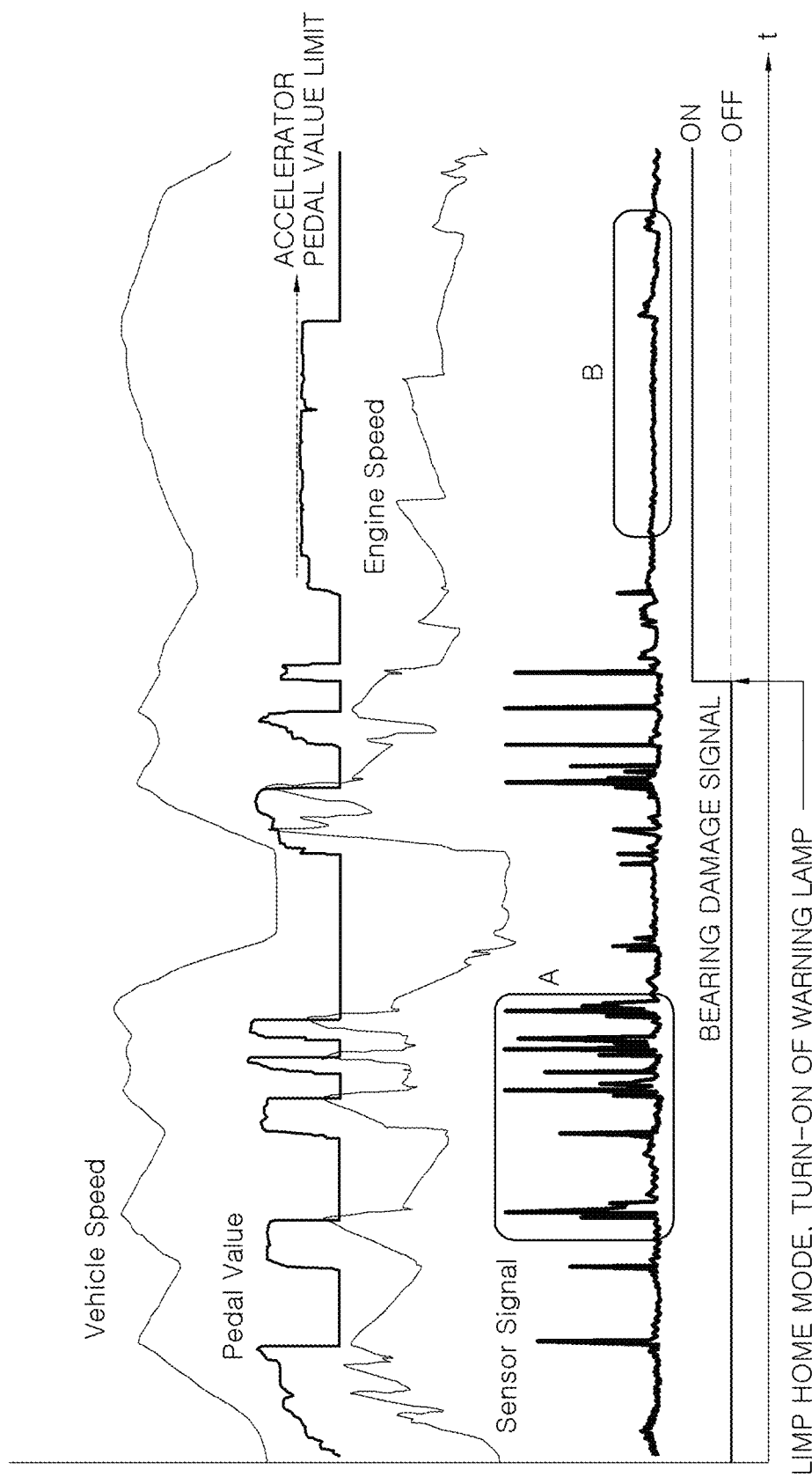

METHOD FOR SENSING DAMAGE OF BEARING OF ENGINE USING VIBRATION SIGNAL

CROSS-REFERENCES TO RELATED APPLICATION

The present application claims priority to and the benefit of Korean Patent Applications No. 10-2018-0100514, filed on Aug. 27, 2018 and No. 10-2019-0075915, filed on Jun. 25, 2019, which are incorporated herein by reference in its entirety.

TECHNICAL FIELD

The present disclosure relates to a method for sensing damage of a bearing of an engine using a vibration signal, which can process a vibration signal radiated from an engine mounted on a vehicle even without a sensor for directly sensing damage of a bearing, thereby detecting damage of the bearing.

BACKGROUND

The statements in this section merely provide background information related to the present disclosure and may not constitute prior art.

In an engine of a vehicle, various parts are operated in a state where they are coupled to each other, and a bearing is mounted on a portion where each part is coupled to operate in order to reduce friction.

FIG. 1 shows a portion where a connecting rod 11 and a crankshaft 12 are coupled with each other. The large end portion of the connecting rod 11 is fastened to surround a crank pin 12b at the crank shaft 12, and a bearing 13 is provided between the large end portion of the connecting rod 11 and the crank pin 12b. The crankshaft 12 is supported to a cylinder block through a crank journal 12a, and the small end portion of the connecting rod 11 is connected with a piston 14. In addition, engine oil is filled between the large end portion of the connecting rod 11 and the crank pin 12b to reduce friction between the large end portion of the connecting rod 11 and the crank pin 12b at operation. In a normal state (see FIG. 1), a gap between the bearing 13 and the crank pin 12b is small, and an oil film is formed therebetween, such that noise and vibration are small.

However, in the case that the engine progresses long-term durability in an abnormal condition (e.g., foreign matter inflow, oil shortage, poor connecting rod journal processing state, etc.) (see FIG. 2), when the engine continuously operates in a state where the bearing 13 has been worn and damaged, a gap G between the bearing 13 and the crank pin 12b is increased, and noise and vibration occur due to the hitting of the connecting rod 11 and the crank pin 12b at operation of the engine.

If such a state is continued, as shown in FIG. 3, the bearing 13 is seized in the crank pin 12b to block the oil from being supplied between the large end portion of the connecting rod 11 and the crank pin 12b. As described above, when the engine operates in a state where the bearing 13 has been damaged in the connecting rod 11, the seizure progresses and the metal contacts the bearing 13, the large end portion of the connecting rod 11, etc. to occur noise and vibration out of the normal range. In addition, there occurs the phenomenon that the bearing 13, etc. is broken.

When the bearing 13 is broken, an increase in frictional resistance causes the engine stall phenomenon of the vehicle. That is, when the bearing 13 is broken, the output of the engine is reduced due to an increase in frictional resistance, and when an accelerator pedal is operated to make up for it, the RPM of the engine increases. However, an increase in the RPM of the engine causes to repeat the vicious cycle that again increases the frictional resistance of the portion where the bearing 13 has been installed. At this time, the temperature of the friction portion rises due to an increase in frictional resistance, thereby accelerating seizure as the temperature of the bearing 13 rises, and thereby damaging the parts adjacent to the bearing 13, that is, the connecting rod 11 and the crank pin 12b.

As described above, when the seizure of the bearing 13 occurs, it causes the overall problem of the engine, thereby occurring the problem such as engine stall, and this cannot be solved only by repairing or replacing any one part, and the entire engine should be maintained or replaced.

SUMMARY

The present disclosure provides a method for sensing damage of a bearing of an engine, which processes by separating a vibration signal radiated from an engine, and while monitoring it, uses the vibration signal confirming it as the damage of the bearing when the vibration exceeding a predetermined number of times is input, even without adding a separate hardware.

A method for sensing damage of a bearing of an engine using a vibration signal for achieving the object includes separating a signal that separates a vibration signal of an engine sensed by a vibration sensing means installed at one side of the engine of a vehicle into a vibration signal by combustion knocking and a vibration signal of a bearing installed between a crank pin and a connecting rod; processing a signal that extracts and integrates a signal of a predetermined natural frequency band through a signal processing filter from the vibration signal of the bearing; determining damage of the bearing that determines whether the vibration signal of the bearing is higher than a predetermined bearing damage threshold, in a predetermined engine state specific condition in order to sense breakage of the bearing during operation of the engine; and confirming the damage of the bearing that confirms that the bearing has been damaged, and the vibration signal of the bearing can be mutually distinguished from the vibration signal by combustion knocking according to the engine state specific condition or a rotation angle of the crankshaft.

The engine state specific condition includes any one of a state where the engine is an initial deceleration that starts deceleration or a state where the engine enters an idle during deceleration.

The state where the engine enters an idle during deceleration comprises a state where the engine enters an idle state in a fuel cut state during deceleration and a state where the engine enters an idle state without a fuel cut state during deceleration.

The method for sensing the damage of the bearing of the engine using the vibration signal includes, in the engine state specific condition, increasing a monitoring counter for each engine state specific condition, respectively, and further includes, after the determining the damage of the bearing, increasing a damage counter every time the vibration signal of the bearing is higher than the predetermined bearing damage threshold.

The confirming the damage of the bearing confirms the damage of the bearing, in the condition where the increased monitoring counter is smaller than or equal to a predetermined damage determination accumulative monitoring counter.

The vibration signal of the bearing is received from one generated in a predetermined sensing section with respect to the rotation angle of the crankshaft.

The sensing section is set for each cylinder, and is a certain angle range before and after a top dead center (TDC).

The method for sensing the damage of the bearing of the engine using the vibration signal further includes, after the confirming the damage of the bearing, a limp home mode that limits the RPM of the engine to a predetermined safety maximum engine RPM or less by the engine; or operating a warning means installed in the interior of the vehicle, and for alarming the damage of the bearing to a passenger when the bearing is damaged.

Meanwhile, a method for sensing damage of a bearing of an engine using a vibration signal includes separating a signal that separates a vibration signal of an engine sensed by a vibration sensing means installed at one side of the engine of a vehicle into a vibration signal by combustion knocking and a vibration signal of a bearing installed between a crank pin and a connecting rod; processing a signal that extracts and integrates a signal of a predetermined natural frequency band through a signal processing filter from the vibration signal of the bearing; increasing a damage counter every time the vibration signal of the bearing is higher than a predetermined bearing damage threshold for each engine state specific condition, in a predetermined engine state specific condition in order to sense breakage of the bearing during operation of the engine; and confirming the damage of the bearing that confirms that the bearing has been damaged, and the confirming the damage of the bearing can confirm the damage of the bearing, in the condition where the increased monitoring counter is smaller than or equal to a predetermined damage determination accumulative monitoring counter.

The engine state specific condition includes any one of a state where the engine is an initial deceleration that starts deceleration or a state where the engine enters an idle during deceleration, or a state where the engine enters an idle state in a fuel cut state during deceleration.

The method for sensing the damage of the bearing of the engine using the vibration signal further includes increasing a monitoring counter for each engine state specific condition, respectively, and the confirming the damage of the bearing confirms the damage of the bearing, when the increased damage counter reaches the damage confirmation accumulative damage counter, in the condition where the increased monitoring counter is smaller than or equal to the predetermined damage determination accumulative monitoring counter.

In addition, a method for sensing damage of a bearing of an engine using a vibration signal includes separating a signal that separates a vibration signal of an engine sensed by a vibration sensing means installed at one side of the engine of a vehicle into a vibration signal by combustion knocking and a vibration signal of a bearing installed between a crank pin and a connecting rod; processing a signal that extracts and integrates a signal of a predetermined natural frequency band through a signal processing filter from the vibration signal of the bearing; determining damage of the bearing that determines whether the vibration signal of the bearing is higher than a predetermined bearing damage threshold, in a predetermined engine state specific condition in order to sense breakage of the bearing during operation of the engine; and confirming the damage of the bearing that confirms that the bearing has been damaged, and the vibration signal of the bearing can also be sensed in a predetermined sensing section with respect to the rotation angle of the crankshaft.

The sensing section is set separately for each cylinder according to the rotation angle of the crankshaft.

The sensing section is formed in a predetermined angle range from the ignition timing of each cylinder.

The sensing section is in a certain angle range before and after a top dead center (TDC) of each cylinder.

The method for sensing the damage of the bearing of the engine using the vibration signal further includes, in the engine state specific condition, increasing a monitoring counter for each engine state specific condition, respectively; and increasing a damage counter every time the vibration signal of the bearing is higher than the predetermined bearing damage threshold.

The confirming the damage of the bearing confirms the damage of the bearing, in the condition where the increased monitoring counter is smaller than or equal to a predetermined damage determination accumulative monitoring counter.

The processing the signal sets 1.5 kHz to 2.5 kHz in the vibration signal generated from the bearing as a center frequency, sets a frequency band within a predetermined frequency band in the center frequency as an natural frequency band, and removes a signal other than the natural frequency band.

According to the method for detecting damage of the bearing of the engine using the vibration signal of the present disclosure having the above-described configuration, it is possible to sense the damage of the bearing by processing the vibration signal input to the knocking sensor already mounted to the engine without adding the separate hardware component. Particularly, it is possible to accurately sense the damage of the bearing through the discriminative vibration by the damage of the bearing in a state where the load applied to the bearing suddenly changes while the vehicle is decelerating.

It is possible to initially sense the damage of the bearing, thereby preventing the engine from being damaged by the vehicle traveling forcibly in a state where the bearing has been damaged.

In addition, it is possible to enter the limp home mode of the vehicle when the damage of the bearing is sensed, thereby moving the vehicle to the safety zone or the auto repair shop while preventing the damage of the bearing from progressing.

In addition, it is possible to allow the driver to recognize this, thereby inducing maintenance.

Then, it is possible to recognize that the damaged bearing is which cylinder's bearing. Therefore, it is possible to directly replace the damaged bearing without finding which cylinder's bearing, thereby saving the time required for replacing the bearing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 is a graph showing an example in which a sensing section sensing the vibration signal of the bearing has been set for each cylinder according to the rotation angle of a crankshaft.

FIG. 8C is a graph showing a state of the engine at the initial deceleration and a state of a knocking sensor in the engine with the bearing damaged.

FIG. 11B is a graph showing a bearing damage threshold according to each operation condition in the method for sensing damage of the bearing of the engine using the vibration signal in one form of the present disclosure.

FIG. 12 is a graph showing states of a vehicle speed, an accelerator pedal value, an engine RPM, and a sensor signal before and after confirming the damage of the bearing in the method for sensing damage of the bearing of the engine using the vibration signal in one form of the present disclosure.

Figure 1:
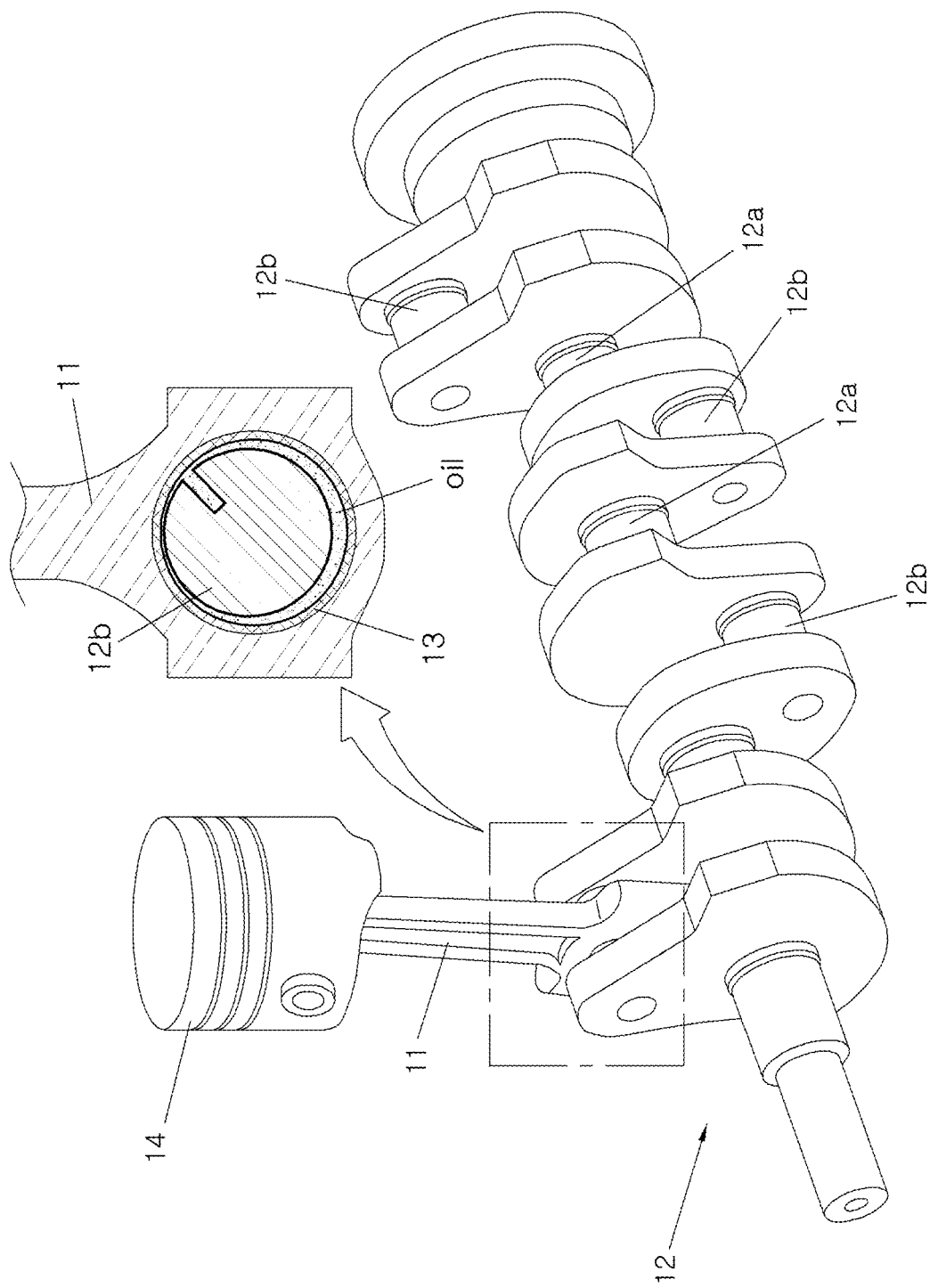
FIG. 1 is cross-sectional diagrams showing a procedure in which a bearing is seized on a portion where a connecting rod and a crank pin in an engine are connected.
Figure 2:
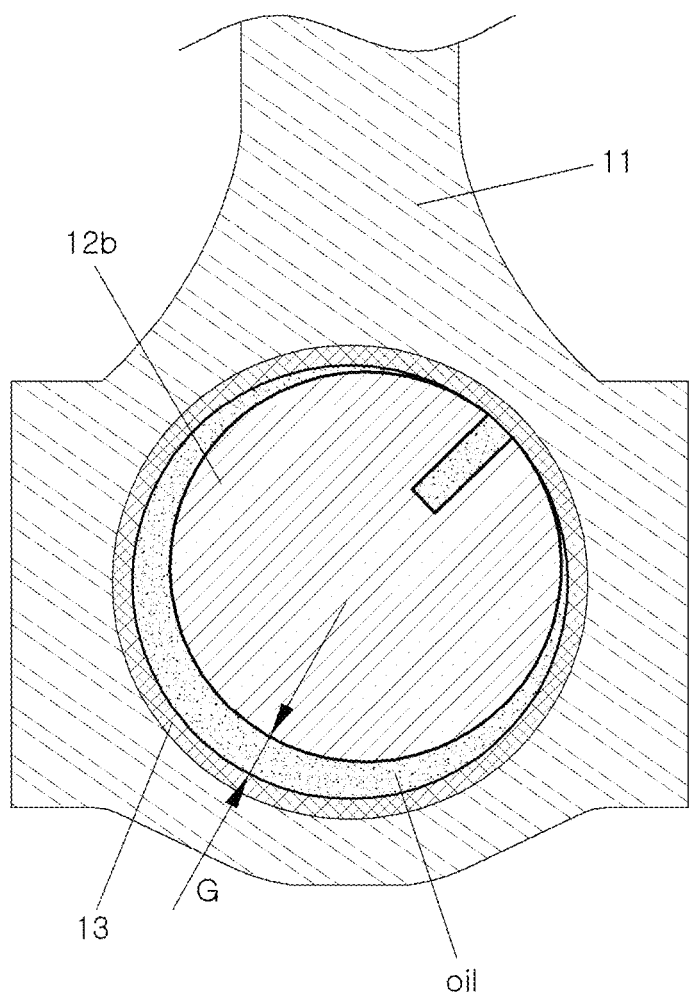
FIG. 2 is cross-sectional diagrams showing a procedure in which a bearing is seized on a portion where a connecting rod and a crank pin in an engine are connected.
Figure 3:
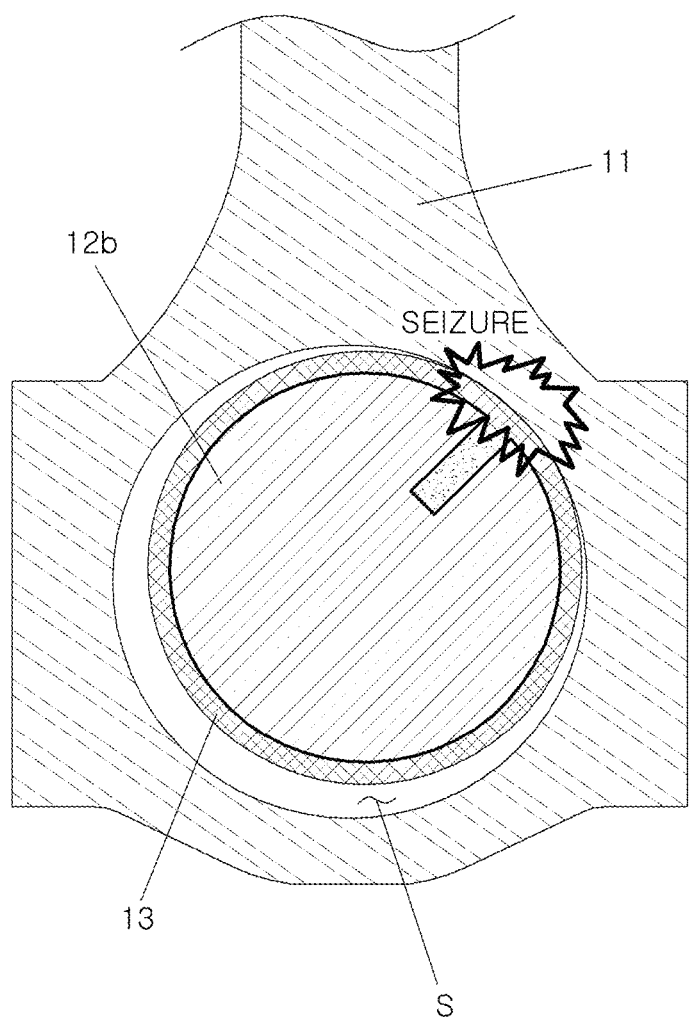
FIG. 3 is cross-sectional diagrams showing a procedure in which a bearing is seized on a portion where a connecting rod and a crank pin in an engine are connected.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method for sensing damage of a bearing of an engine using a vibration signal according to the present disclosure will be described in detail with reference to the accompanying drawings.

Firstly, a system for performing a method for sensing damage of a bearing of an engine using a vibration signal according to the present disclosure will be described as follows.

Figure 4:
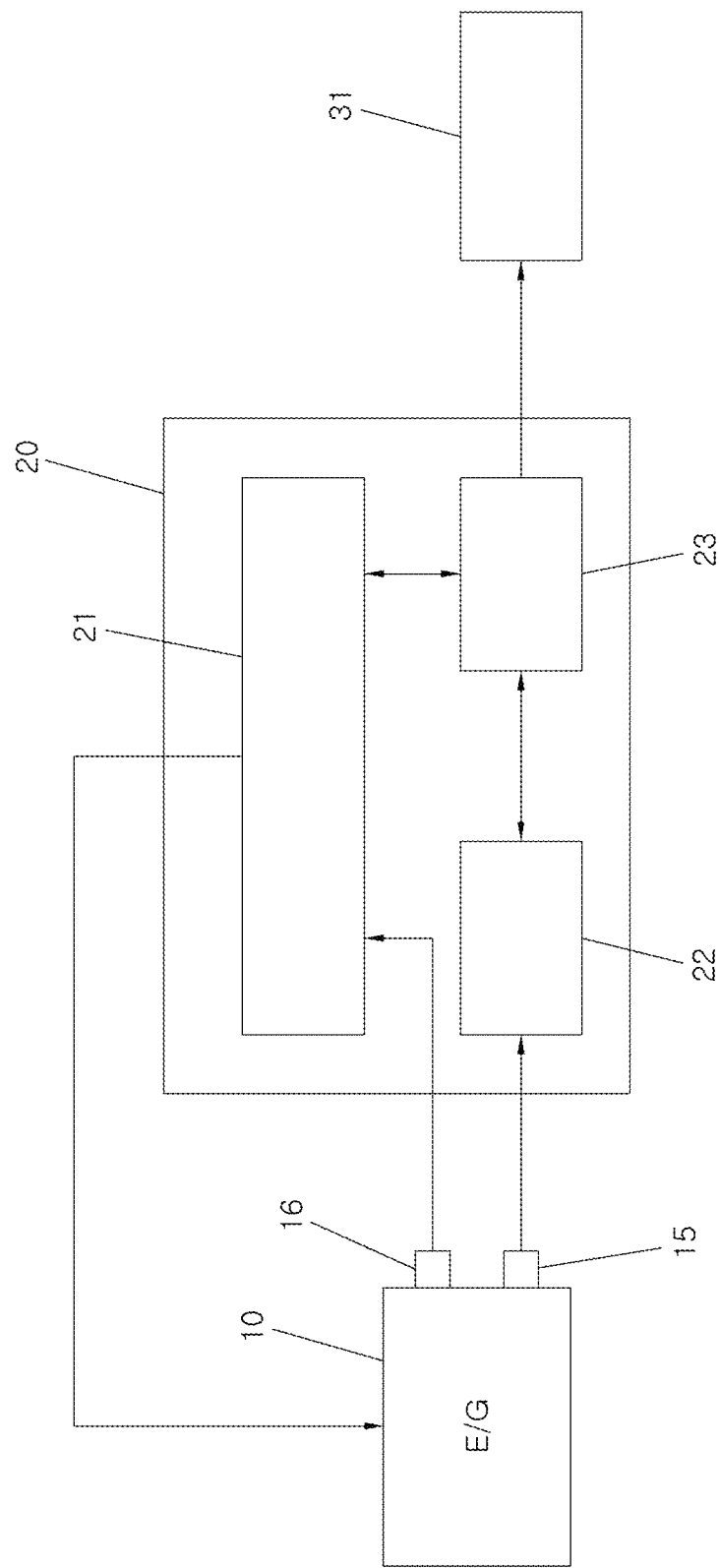
FIG. 4 is a block diagram showing a system for performing a method for sensing damage of the bearing of the engine using a vibration signal in one form of the present disclosure.
Figure 5:
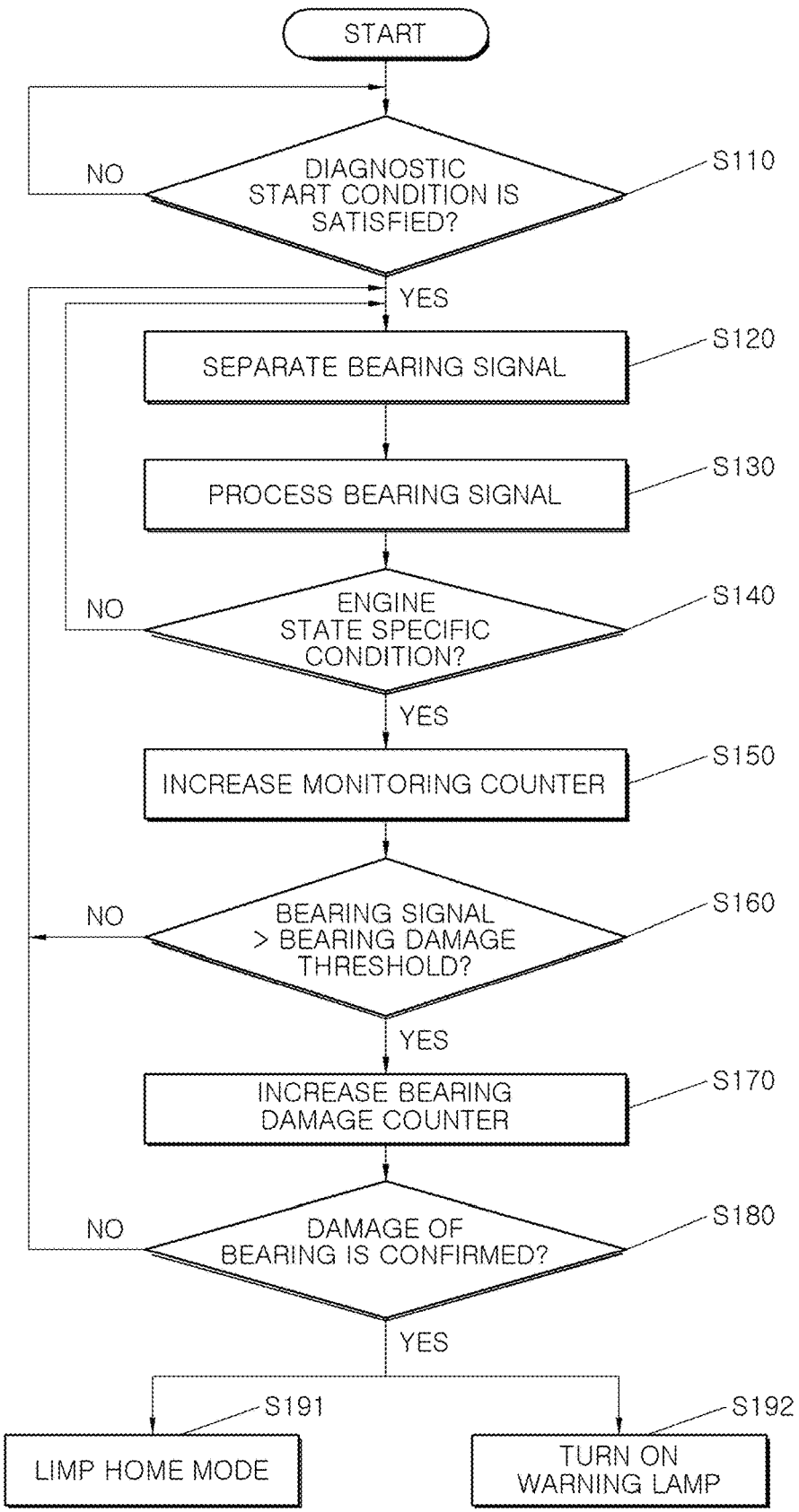
FIG. 5 is a flowchart showing the method for sensing damage of the bearing of the engine using the vibration signal in one form of the present disclosure.

As shown in FIG. 4, the system includes a knocking sensor 15, which is an example of a vibration sensing means installed at one side of an engine 10 and for sensing knocking of the engine by measuring the vibration transferred from the engine 10, and a control unit 20 for controlling the operation of the engine 10, and determining that a bearing 13 of the engine 10 has been damaged when the magnitude of a vibration signal generated by damage of the bearing among the vibration signals generated from the engine 10 is greater than a bearing damage threshold.

The knock sensor 15, which is a sensing means for sensing the vibration generated from the engine 10 at operation of the engine 10, is installed at one side of the engine 10. The knocking sensor 15 senses the vibration signal generated by the knocking when the knocking occurs upon combustion.

In the present disclosure, considering the bearing 13 installed on a portion where a crank pin 12*b* of a crankshaft 12 and the connecting rod 11 are connected generates vibration even when being damaged, the knocking sensor 15 senses the vibration due to the damage of the bearing 13 as well as the vibration generated by the knocking.

The bearing 13 rotates around the crank pin 12*b* at rotation of the crankshaft 12 (the bearing rotates around the crank pin), and rotates around the crankshaft 12 by the trajectory formed by the crank pin 12*b* (the bearing revolves around the crankshaft) at the same time.

Generally, the bearing for supporting a rotary shaft continuously receives a constant force during rotation regardless of phase.

However, the combustion pressure generated in a combustion chamber and the inertia force by the operation of a piston 14 and the connecting rod 11 act on the bearing 13, while the bearing 13 (hereinafter, the bearing means the bearing installed at the crank pin of the crankshaft) installed on the crank pin 12*b* of the crankshaft 12 performs the satellite motion (rotation and revolution) with respect to the rotation center of the crankshaft 12. Since this force (the force by the combustion pressure and the force by the inertia force) varies according to the phase of the crankshaft 12, there is the characteristic in that the force applied to the bearing 13 becomes different from the force applied to the bearing 13 according to the phase of the crankshaft 12. In the present disclosure, the damage of the bearing 13 installed on the crank pin 12b is sensed by using it.

However, the vibration sensed by the knocking sensor 15 senses the knocking and the damage of the bearing through signal separation and signal processing, respectively.

The vibration signal sensed by the knocking sensor 15 can also confirm which cylinder's bearing 13 has been damaged by processing the window, which is a specific rotation angle range of the engine capable of generating a signal, according to the rotation angle of the crankshaft (an X axis in FIG. 7: one cycle is two rotation angle of the crankshaft).

Particularly, as shown in FIG. 7, it is possible to sense the damage of the bearing 13 by setting a sensing section for each cylinder.

The sensing section can be set for the rotation angle of the crankshaft. At this time, the sensing section can be also set for each cylinder. As shown in FIG. 7, it is possible to set the sensing sections A1 to A4 for each cylinder in order to sense bearing vibration signals of first to fourth cylinders.

At this time, the sensing section can be set from immediately before the top dead center (TDC) of each cylinder to a predetermined angle after the TDC. Particularly, the starting point of the sensing section can start between the ignition timing and the TDC. The load of the connecting rod 11 can rapidly increase from the ignition timing in each cylinder, thereby sensing the vibration signal of the bearing 13 in a section where the load of the connecting rod 11 increases.

Therefore, it is possible to confirm which cylinder's bearing is damaged to generate the bearing damage signal.

Meanwhile, the reason why the piston senses the damage of the bearing 13 around the TDC is as follows. When the bearing of the engine is damaged, noise occurs around the TDC of the piston. An impulsive noise occurs in the bearing 13 whose gap is enlarged while the combustion pressure of the combustion chamber is maximized around the top dead center of the piston 14. In addition, the gap between the bearing 13 and the crank pin 12b of the crankshaft 12 is increased, thereby occurring noise while the upper surface of the piston 14 collides with a cylinder head. For such a reason, the vibration characteristic is monitored around the TDC of the piston 14.

In addition to the knocking sensor 15, various sensors for measuring the state of the engine 10 are installed at one side of the engine 10. For example, an oil temperature sensor 16 for measuring the temperature of the engine oil can be installed to confirm the temperature of the engine oil.

The control unit 20 processes the signal input from the knocking sensor 15 to determine whether the connecting rod bearing 13 is damaged, while controlling the combustion of the engine 10 according to the driver's operation. For example, the control unit 20 can include an engine control unit 21 for controlling the combustion of the engine 10 according to the driver's operation, a signal processing unit 22 for separating the signal from the knocking sensor 15 to separate it into the vibration signal by the knocking and the vibration signal by the damage of the bearing, and quantifying the bearing signal, and a bearing damage determination unit 23 for determining the damage of the bearing 13 by the bearing signal processed by the signal processing unit 22. Since the control unit 20 stores a method for sensing the damage of the bearing of the engine using the vibration signal described later as logic, the method for sensing the damage of the bearing of the engine using the vibration signal is performed by the control unit 20.

The engine control unit 21 controls the combustion of the engine 10 so that the engine 10 can generate the required torque according to the driver's operation, the traveling state of the vehicle, etc. Since the control of the engine 10 by the engine control unit 21 corresponds to the control of the typical engine 10, a detailed description thereof will be omitted.

The signal processing unit 22 separates the vibration signal by the damage of the bearing 13 from the vibration signal by the combustion knocking among the signals output from the knocking sensor 15. The knock signal separated by the signal processing unit 22 is used to control knocking by separate knocking control logic. Particularly, it is processed as a quantified bearing signal by extracting, amplifying, and integrating a signal of a predetermined natural frequency band from the bearing signal separated by the signal processing unit 22.

The bearing damage determination unit 23 determines whether the bearing 13 has been damaged by comparing the bearing signal with a predetermined bearing damage threshold. The bearing damage determination unit 23 determines the damage of the bearing 13 by the method for sensing the damage of the bearing of the engine using the vibration signal described later. When the bearing damage determining unit 23 determines that the bearing 13 has been damaged, the engine control unit 21 controls so that the engine operates in a limp home mode.

A warning means alerts the passenger to recognize the damage of the bearing 13, when the control unit 20 determines that the bearing 13 has been damaged.

For example, the warning means can be a warning lamp 31 installed in an interior or a dashboard of the vehicle. When sensing the damage of the bearing 13, the control unit 20 lights the warning lamp 31 so that the passenger can recognize the damage of the bearing 13.

Meanwhile, as another example of the warning means, it can be a speaker installed at one side of the interior of the vehicle.

A method for sensing the damage of the bearing of the engine using the vibration signal according to the present disclosure includes separating a signal that separates the vibration signal of the engine 10 sensed by the vibration sensing means installed at one side of the engine of the vehicle into the vibration signal by the combustion knocking and the vibration signal generated from the bearing 13 S120, processing a signal that processes the vibration signal generated from the bearing 13 as a quantified bearing signal by extracting, amplifying, and integrating a signal of a predetermined natural frequency band through a signal processing filter S130, and determining the damage of the bearing that compares whether the bearing signal is higher than a predetermined bearing damage threshold S160.

Figure 6A:
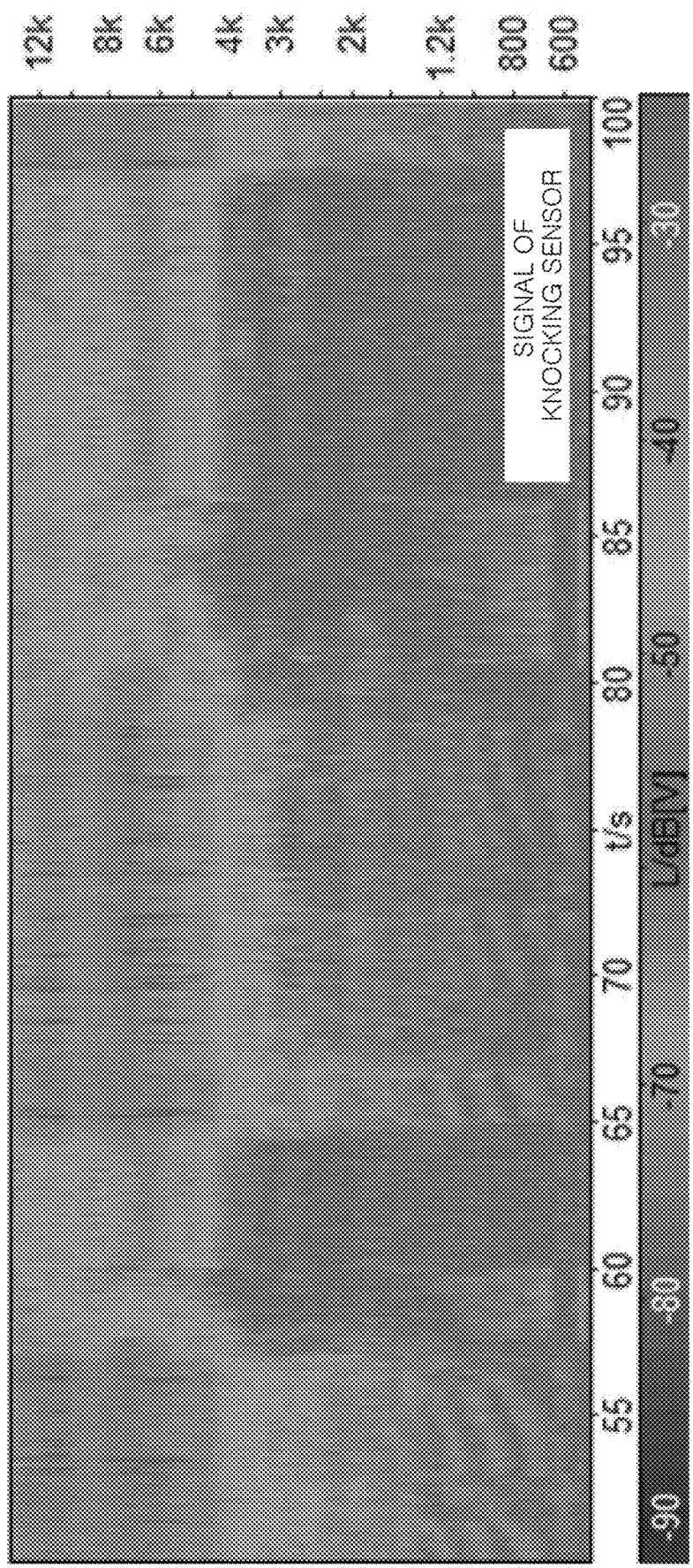
FIG. 6A is a graph showing a state where a signal measured by a vibration sensor at deceleration in a normal engine has been subject to Fast Fourier Transform.
Figure 6B:
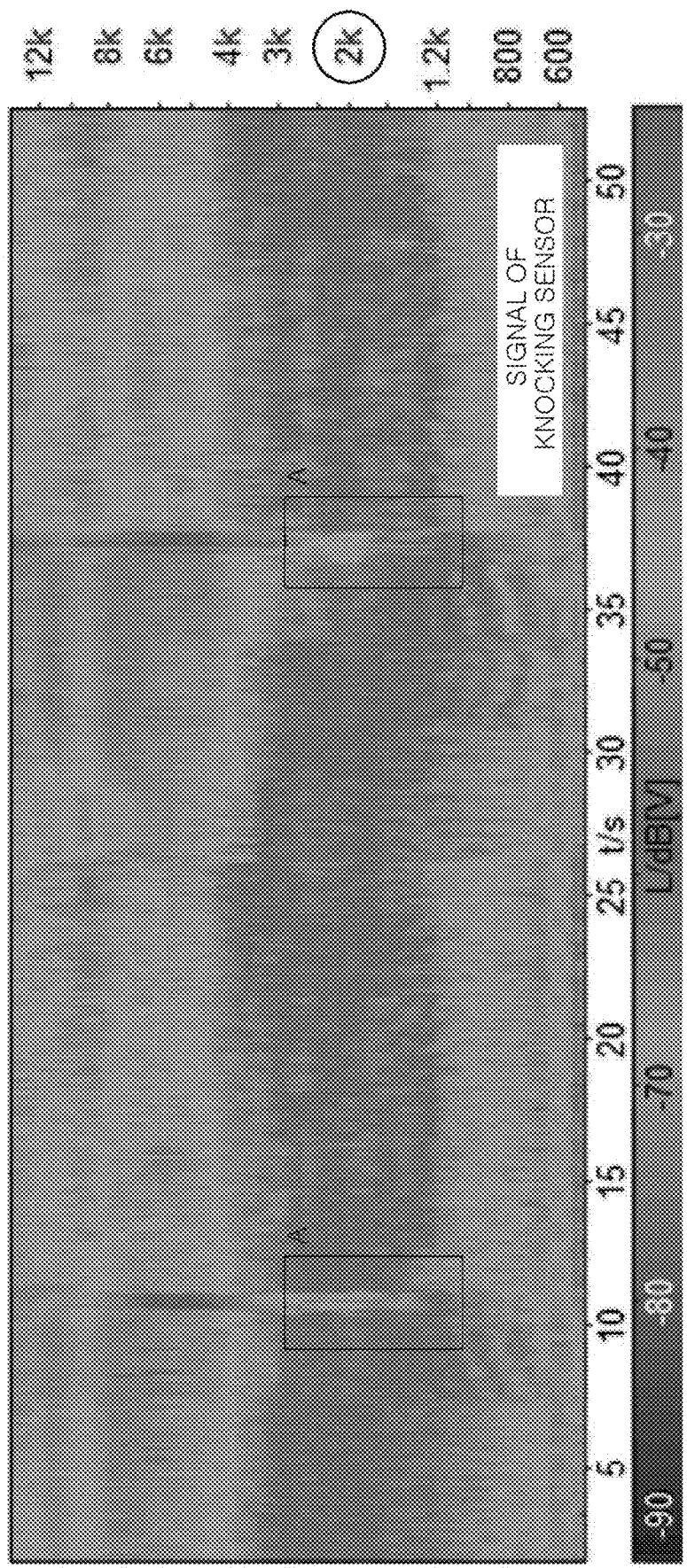
FIG. 6B is a graph showing a state where a signal measured by a vibration sensor at deceleration in the engine with the bearing damaged has been subject to Fast Fourier Transform.

FIGS. 6A and 6B show the vibration signals of the normal engine with the bearing not damaged (FIG. 6A) and the engine with the bearing damaged (FIG. 6B), respectively.

Comparing by processing the Fast Fourier transform (FFT) on the signal measured by the knocking sensor in the deceleration condition during traveling, it can be seen that the engine with the bearing damaged 13 has an natural frequency around 2 kHz as compared to the normal engine. When the frequency of the combustion knocking measured by the knocking sensor 15 has inherent frequencies at the first 5 to 6 kHz, the second 11 to 12 kHz and the third 15 to 16 kHz, while when the bearing 13 is damaged, it has an natural frequency around 2 kHz, thereby sensing the damage of the bearing 13 by using it.

In addition, in the normal engine, when the deceleration is progressed during operation, the load applied to the bearing 13 reduces as the speed of the engine reduces, but in the engine with the bearing damaged, the clearance is increased due to the damage of the bearing to increase the vibration sensed by the engine 10, and this has the characteristics different from the vibration by the knocking, thereby sensing the damage of the bearing 13 by using this principle.

Determining satisfaction of a diagnostic start condition S110 determines whether the engine 10 or the vehicle is in a state for sensing the damage of the bearing 13. Since the present disclosure senses the damage of the bearing 13 by using the vibration generated from the engine 10 during the operation of the engine 10, the engine 10 warms up sufficiently to determine whether the vibration signal of the engine 10 has been stabilized, and then the diagnosis of the bearing 13 is started. Before the engine 10 warms up, noises due to friction of various kinds of machines occur and the damage of the bearing 13 cannot be accurately diagnosed, such that it is determined whether the engine 10 has warmed up, and the damage of the bearing 13 is diagnosed in a state where the engine has warmed up. Meanwhile, since the state of the engine 10 is diagnosed by using the vibration of the engine 10, the present disclosure determines whether it has been warmed up at the temperature of the engine oil instead of the temperature of the coolant. When the temperature (T_oil) of the engine oil is higher than a predetermined diagnostic start temperature (T_THD) (T_oil>T_THD), the diagnosis for the damage of the bearing 13 can be started. Herein, the diagnostic start temperature (T_THD) can be set to 80° C.

The separating the signal S120 separates the signal measured from the vibration sensing means installed in the engine 10. Since the signal measured by the vibration sensing means is a state where the vibration by the knocking of the engine 10 and the vibration by the damage of the bearing 13, etc. are overlapped with each other, the vibration signal by the bearing is separated among the vibration signals measured from the vibration sensing means. The knocking sensor can be used as the vibration sensing means, and hereinafter, the knocking sensor will be described as an example of the vibration sensing means.

The procedure of separating the vibration signal by the bearing 13 among the vibration signals measured by the knocking sensor 15 performs a Fast Fourier Transform on the vibration signal measured by the knocking sensor 15 to separate the frequency band (around 2 kHz) by the vibration signal of the bearing 13. The remaining frequency bands, that is, 5 to 6 kHz in the first bands, 11 to 12 kHz in the second bands, and 15 to 16 kHz in the third bands are used for sensing knocking, and the frequency band (around 2 kHz) at which the signal different from the normal engine 10 is output when the bearing is damaged is separated and used for sensing the damage of the bearing 13.

The processing the signal S130 removes and quantifies noise from the bearing signal separated in the separating the signal S120.

The processing the signal S130 processes the separated vibration signal of the bearing as a quantified bearing signal by extracting, amplifying, and integrating a signal of a predetermined natural frequency through the signal processing filter.

The vibration signal of the bearing 13 is passed through the signal processing filter to leave only the signal of the band adjacent to the natural frequency and to remove the signal of the remaining band. When vibration occurs in the engine 10 due to the damage of the bearing 13, an abnormal signal is generated around 2 kHz (see FIG. 6A) unlike upon knocking, such that the processing the signal S130 sets, for example, a frequency selected from a range of 1.5 kHz to 2.5 kHz as a center frequency, and leaves only the signals of adjacent bands within a predetermined range from the center frequency. For example, when the center frequency is set to 2 kHz, based on 2 kHz±0.435 kHz, only the signal of 1.565 kHz to 2.435 kHz is left, and other signals (lower than 1.565 kHz and higher than 2.435 kHz) are removed. The center frequency and the size of the adjacent band from the center frequency can be selected according to the situation.

Then, the signals are quantified through amplification, integration, etc., thereby being processed as the bearing signal for sensing the damage of the bearing 13.

As described above, the signal of the bearing are processed in a noise-canceled and quantified state, and then compared with the bearing damage threshold.

Of course, the process of sensing the knocking by using the frequency bands of the first 5 to 6 kHz, the second 11 to 12 kHz, and the third 15 to 16 kHz, which are not used in the separating the signal S120, is progressed separately regardless of the present disclosure.

The separating the signal S120 and the processing the signal S130 are continuously performed when the engine 10 is in operation after the determining the satisfaction of the diagnostic start condition S110.

Determining an engine state S140 determines whether the state of the engine 10 is a state for sensing the damage of the bearing 13. That is, it determines whether the state of the engine 13 is in an engine state specific condition, which is an operation condition for determining the breakage of the bearing 13 while sensing the operation state of the engine 10. That is, the engine state specific condition is a specific operation condition of the engine suitable for sensing the breakage of the bearing 13 among various operation states of the engine.

Since whether the bearing 13 has been damages can be mainly monitored at deceleration of the engine 10, it is sensed whether the engine 10 is in a deceleration state.

When the engine 10 is decelerating, the load applied to the bearing 13 is rapidly changed through the connecting rod 11, and when the bearing 13 is in a damaged state, the discriminative vibration signal is generated from the bearing 13, thereby sensing the damage of the bearing 13 by using it.

Particularly, it is preferable that the determining engine state S140 determines whether the engine 10 is in a predetermined condition while decelerating. Therefore, the engine state specific condition senses whether the state of the engine 10 is any one of a deceleration initial state where the RPM of the engine starts to reduce, an idle entering state during deceleration changed to an idle engine RPM while the RPM of the engine reduces, and an idle entering state in a fuel cut state during deceleration. Even if the engine 10 is in the initial deceleration state, the idle entering state during deceleration of the engine, and the fuel cut state during deceleration when the bearing 13 is not broken, the load acting on the bearing 13 is small, such that the signal generated from the bearing 13 is not large. However, when the bearing 13 is damaged, the vibration signal generated from the bearing 13 has the discrimination power exceeding a predetermined value, such that the present disclosure determines the damage of the bearing 13 by using it.

That is, since the vibration signal by the breakage of the bearing 13, by which the bearing 13 installed between the crank pin 12b and the connecting rod 11 is broken, and the vibration signal by the rotation of the crankshaft are distinguished from each other according to the sensed operation state of the engine, the breakage of the bearing 13 installed between the crank pin 12b and the connecting rod 11 is sensed by using it.

The reason for sensing the damage of the bearing 13 in the vehicle deceleration condition is as follows.

When the vehicle decelerates during acceleration, the RPM of the engine gradually reduces in the medium and high speed condition. At this time, since the output of the engine is not required, combustion work decreases rapidly and the amount of intake air is also reduced. As the amount of the intake air reduces, the air to be compressed by the piston 14 is reduced, such that a rise in the pressure in the combustion chamber is small. The pressure in the combustion chamber is small, but the engine is in a high-speed condition, such that there is a high possibility that the piston collides with the cylinder head due to the inertia force of the piston as it ascends to the TDC. For this reason, as described above, since the noise due to the damage of the bearing occurs, the damage of the bearing is sensed by using the deceleration condition.

In addition, the determining the engine state S140 can also sense whether the state of the engine 10 is any one of an idle operation state and a partial load operation state.

The determining the engine state S140 can determine the state of the engine 10 by an rpm signal input from the engine 10 to the control unit 20.

In the separating the signal S120, the processing the signal S130, and the determining the engine state S140, the determining the engine state S140 is firstly performed, and thereafter, the separating the signal S120 and the processing the signal S130 can also be performed.

When the state of the engine 10 is any one of the deceleration initial state, the idle entering state during deceleration, and the idle entering state in the fuel cut state during deceleration, increasing a monitoring counter S150 for increasing a monitoring count is performed.

When the engine 10 is in the deceleration initial state, the idle entering state during deceleration, or the idle entering state in the fuel cut state during deceleration, the monitoring counter is increased from a current monitoring counter (the current monitoring counter→the current monitoring counter+1).

Meanwhile, the counters used in the present disclosure are defined as follows.

The monitoring counter is a counter that increases each time the engine at operation enters each of the engine state specific conditions described above.

A damage determination accumulative monitoring counter is a reference for confirming the damage of the bearing 13 by accumulating the monitoring counter by one for each engine state specific condition, and means a maximum value among the values obtained by accumulating the monitoring counter by one.

The damage counter is a counter that increases each time the signal of the bearing is equal to or more than the bearing damage threshold.

The damage confirmation accumulative damage counter is a reference for confirming the damage of the bearing by accumulating the damage counter by one for each engine state specific condition, and means a maximum value among the values obtained by accumulating the damage counter by one.

The increasing the monitoring counter S150 increases the monitoring counter only in the same state of the engine. For example, when the current state of the engine is again sensed as the idle entering state during deceleration in a state where the current monitoring counter for the idle entering state during deceleration is '1', the monitoring counter for the idle entering state during deceleration is increased to '2'. When the idle entering state in the fuel cut state during deceleration is newly sensed, the monitoring counter for the idle entering state during deceleration is maintained, and the monitoring counter for the idle entering state in the fuel cut state during deceleration is increased (+1).

This is the same even in the remaining states, that is, the deceleration initial state, or the idle entering state during deceleration, or the idle entering state in the fuel cut state during deceleration, and the monitoring counter is increased for the case where the state of the engine 10 is the same state, and the monitoring counter is managed independently for the states of the engine different from each other.

As described above, it is compared whether the bearing vibration signal is higher than the predetermined bearing damage threshold for each engine state specific condition of the engine while increasing the monitoring counter for the engine state specific condition, respectively.

The determining the bearing damage S160 compares the signal of the bearing with the predetermined bearing damage threshold.

The determining the bearing damage S160 determines whether the signal of the bearing is equal to or greater than the bearing damage threshold by comparing the signal of the bearing 13 transformed in the processing the signal S130 with the bearing damage threshold, which determines that the bearing 13 has been damaged.

It is preferable that the bearing damage threshold is set differently according to the operation state of the engine 10. In addition, the bearing damage threshold can be set lower than the bearing damage threshold at the initial deceleration when it is the idle entering state during deceleration.

Increasing a damage counter S170 increases the damage counter for a current damage counter, when the signal of the bearing is equal to or greater than the bearing damage threshold in the determining the bearing damage S160 (current damage counter→current damage counter+1).

If the signal of the bearing is equal to or greater than the bearing damage threshold in a state where the current damage counter is '0', the damage counter is increased to '1'.

Meanwhile, in the increasing the damage counter S170, the reference for increasing the damage counter can be set differently according to the sensed operation state of the engine, that is, for each engine state specific condition. A reference for increasing the damage counter when the operation state of the engine is in the deceleration initial state, a reference for increasing the damage counter when the operation state of the engine is in the idle entering state during deceleration, and a reference for increasing the damage counter when the operation state of the engine is in the idle entering state in the fuel cut state during deceleration can be set differently.

The confirming the bearing damage S180 confirms the damage of the bearing 13 by using the damage counter.

The confirming the bearing damage S180 can confirm the damage of the bearing 13, when the value obtained by accumulating the damage counter (accumulative damage counter) is equal to or greater than the predetermined damage confirmation accumulative damage counter in order to confirm the damage of the bearing, in the condition where the value obtained by accumulating by increasing the monitoring counter (accumulative monitoring counter) is smaller than or equal to the predetermined damage determination accumulative monitoring counter in order to confirm the damage of the bearing. The damage confirmation accumulative damage counter is a maximum value among the damage counters accumulated to determine the damage of the bearing 13, and the damage of the bearing 13 is confirmed when the increased damage counter is equal to or greater than the damage confirmation accumulative damage counter, in the condition where the increased monitoring counter is smaller than or equal to the damage determination accumulative monitoring counter.

Herein, the condition where the increased monitoring counter is smaller than or equal to the damage determination accumulative monitoring counter can be the case where the increased monitoring counter is increased to reach the damage determination accumulative monitoring counter and the case where the increased monitoring counter has reached the damage determination accumulative monitoring counter. Then, it can also include the case where the increased monitoring counter has reached the damage determination accumulative monitoring counter and then a new monitoring counter is added at the same time as the oldest monitoring counter is deleted.

Therefore, when the accumulative value of the damage counter reaches the damage confirmation accumulative damage counter even before the value obtained by accumulating by increasing the monitoring counter reaches the damage determination accumulative monitoring counter, it is confirmed as damage. In addition, the same applies to the case where the accumulative value of the monitoring counter has reached the damage determination accumulative monitoring counter. In addition, after the accumulative value of the monitoring counter has reached the damage determination accumulative monitoring counter, the oldest monitoring counter is deleted, and the new monitoring is incorporated to confirm the damage by comparing the accumulative value of the damage counter with the damage confirmation accumulative damage counter while constantly maintaining the damage determination accumulative monitoring counter.

The fact that it is sensed that the bearing has been damaged at the damage confirmation accumulative damage counter or more in the condition that the increased monitoring counter becomes or maintains the damage determination accumulative monitoring counter means that the bearing 13 is damaged and the signal related to the damage of the bearing is frequently output.

As an example of the confirming the damage of the bearing S180, when the damage determination accumulative monitoring counter is set to '5' and the damage confirmation accumulative damage counter is set to '2', it can be confirmed that the bearing 13 has been damaged when the damage confirmation accumulative damage counter is 2 or more in a state where the damage determination accumulative monitoring counter is within 5.

Herein, the damage determination accumulative monitoring counter and the damage confirmation accumulative damage counter, which are set, respectively, for confirming the damage of the bearing can be set differently as necessary.

Particularly, the damage determination accumulative monitoring counter and the damage confirmation accumulative damage counter can be set differently according to the engine state specific condition. For example, when the sensed operation state of the engine is the initial deceleration, the damage determination accumulative monitoring counter and the damage confirmation accumulative damage counter can be set to '5' and '2', respectively to confirm the breakage of the bearing 13. Meanwhile, when the engine state specific condition enters the idle during deceleration or enters the idle in the fuel cut state during deceleration, unlike the above, that is, the damage determination accumulative monitoring counter and the damage confirmation accumulative damage counter can be set to another example rather than '5' and '2', respectively.

In addition, when reaching the damage determination accumulative monitoring counter, a new monitoring counter is added at the same time as the oldest monitoring counter is deleted to constantly maintain the accumulative monitoring counter as the damage determination accumulative monitoring counter that is the maximum value, thereby also sensing the damage of the bearing 13. That is, when the accumulative monitoring counter reaches '5' set to the damage determination accumulative monitoring counter, the damage of the bearing can be determined by counting the damage confirmation accumulative damage counter in the condition that is smaller than or equal to the damage determination accumulative monitoring counter while maintaining the damage determination accumulative monitoring counter (e.g., 5) in the method of deleting the first monitoring counter and adding the new monitoring counter.

When the monitoring counter that is increased by one for each engine state specific condition is equal to the damage determination accumulative monitoring counter as the condition of determining whether to confirm the damage of the bearing (first condition) in the confirming the damage of the bearing S180, that is, when the maximum value among the accumulative monitoring counters is equal to the damage determination accumulative monitoring counter, the confirming the damage of the bearing S180 is performed.

In addition, the confirming the damage of the bearing S180 determines whether the value obtained by accumulating the damage counter has reached the damage confirmation accumulative damage counter (second condition).

That is, the confirming the damage of the bearing S180 confirms that the bearing has been damaged, when the value obtained by accumulating the damage counter reaches the damage confirmation accumulative damage counter while the value obtained by accumulating the monitoring counter is equal to the damage determination accumulative monitoring counter.

When even any one of the two conditions is not satisfied (when the value obtained by accumulating the monitoring counter is smaller than the damage determination accumulative monitoring counter, when the value obtained by accumulating the damage counter is smaller than the damage confirmation accumulative damage counter), it returns to before the determining the engine state S140 for determining whether to enter the engine state specific condition.

Therefore, it is preferable that the determining the damage of the bearing S180 is preferably performed when the first condition and the second condition are satisfied.

In the confirming the damage of the bearing S180, since the damage of the bearing is certain when the value obtained by accumulating the damage counter has already reached the damage confirmation accumulative damage counter, the damage of the bearing can be confirmed even if the accumulative monitoring counter is smaller than the damage determination accumulative monitoring counter.

That is, in the confirming the damage of the bearing S180, even if the accumulative monitoring counter is smaller than the damage determination accumulative monitoring counter, the damage of the bearing can be confirmed when the value obtained by accumulating the damage counter reaches the damage confirmation accumulative damage counter.

This reason is because when the monitoring counter is accumulated and later becomes equal to the damage determination accumulative monitoring counter, the second condition has already been achieved, such that the damage confirmation of the bearing is certain.

For example, the damage counter can be accumulated for the same engine state to confirm the damage of the bearing. When the engine is operated in the idle, damage of the bearing can be confirmed when the damage confirmation accumulative damage counter becomes 3 or more regardless of the damage determination accumulative monitoring counter.

Meanwhile, when it is determined that the bearing 13 has not been damaged in the confirming the damage of the bearing S180, it returns to before the increasing the monitoring counter S150 to continuously monitor the damage of the bearing 13. It can correspond to the case where the accumulative monitoring counter is smaller than the bearing damage determination accumulative monitoring counter or the case where the accumulative damage counter is smaller than the damage confirmation accumulative damage counter.

A limp home mode S191 is performed when it is confirmed that the bearing 13 has been damaged.

The limp home mode S191 limits the RPM of the engine 10 a predetermined safety maximum engine RPM or less so that the damage of the bearing 13 no longer progresses. Since the maximum RPM of the engine 10 is limited, the damage of the bearing 13 can be prevented from progressing.

In addition, the limp home mode S191 also limits the value of an accelerator pedal to a predetermined value so that an appropriate shift can be performed in a state where the RPM has been limited.

In addition, the engine 10 is operated at a predetermined engine-running minimum engine RPM so that the engine-running can be maintained.

As described above, when the bearing has been damaged, the vehicle is allowed to travel in a state where the output has been limited in a state where the engine-running is maintained through the limp home mode S191, such that the vehicle can be moved to a place where maintenance is possible.

Meanwhile, operating a warning means S192 is also performed so that the driver can recognize the damage of the bearing. When it is confirmed that the bearing 13 has been damaged in the confirming the damage of the bearing S180, the warning means installed in the vehicle is operated so that the passenger can recognize it. For example, a warning lamp is installed at one side of the interior of the vehicle or on the instrument panel, and the warning lamp 31 is turned on so that the passenger recognizes the damage of the bearing 13. Meanwhile, the operating the warning means S192 can not only turn on the warning lamp 31, but also alarm the damage of the bearing to the passenger through the warning sound or vibration, thereby avoiding the progress to seizure.

FIG. 12 shows a vehicle speed, an accelerator pedal value, an engine RPM, and a state of a sensor signal before and after the damage of the bearing has been confirmed. The engine with the bearing damaged had a large bearing signal measured and processed by the knocking sensor 15 due to the damage of the bearing 13 before the damage of the bearing 13 is sensed (see a portion A in FIG. 12). However, after the damage of the bearing 13 is sensed and the bearing 13 has been damaged after passing through the limp home mode S191 and the operating the warning means S192, but as a state where the RPM of the engine 10 and the accelerator pedal value have been limited, the bearing signal measured through the knocking sensor 15 can be lowered to a level to which the normal bearing has been applied (see a portion B in FIG. 12), thereby suppressing the damage of the bearing 13 from being progressed. At this time, the driver can recognize the damage of the bearing by the operation of the warning means such as the warning lamp 31, thereby moving the vehicle to the auto repair shop to perform maintenance for the damaged bearing 13.

Meanwhile, FIGS. 8A to 11C show graphs of the load acting on the connecting rod 11 and the state of the bearing 13 at the normal time and at the time of the damage for each state of the engine 10. Embodiments from the determining the engine state S140 to the confirming the damage of the bearing S180 according to the state of the engine 10 will be described as follows.

Figure 8A:
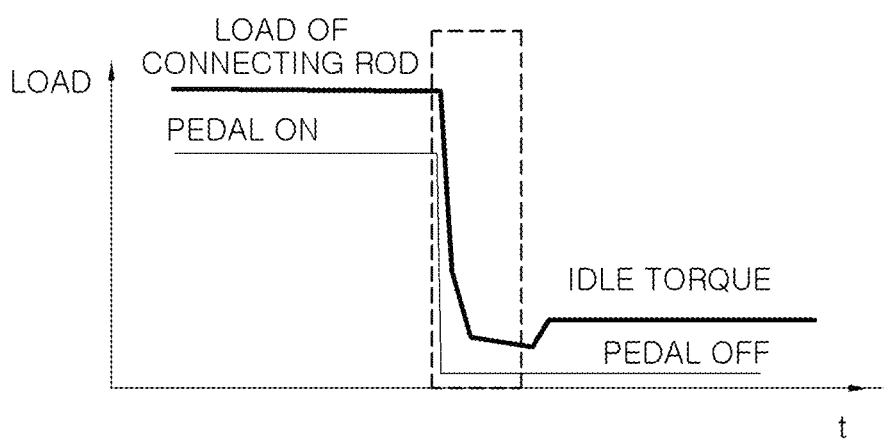
FIG. 8A is a graph showing a variation of the load of the connecting rod at the initial deceleration in the engine.
Figure 8B:
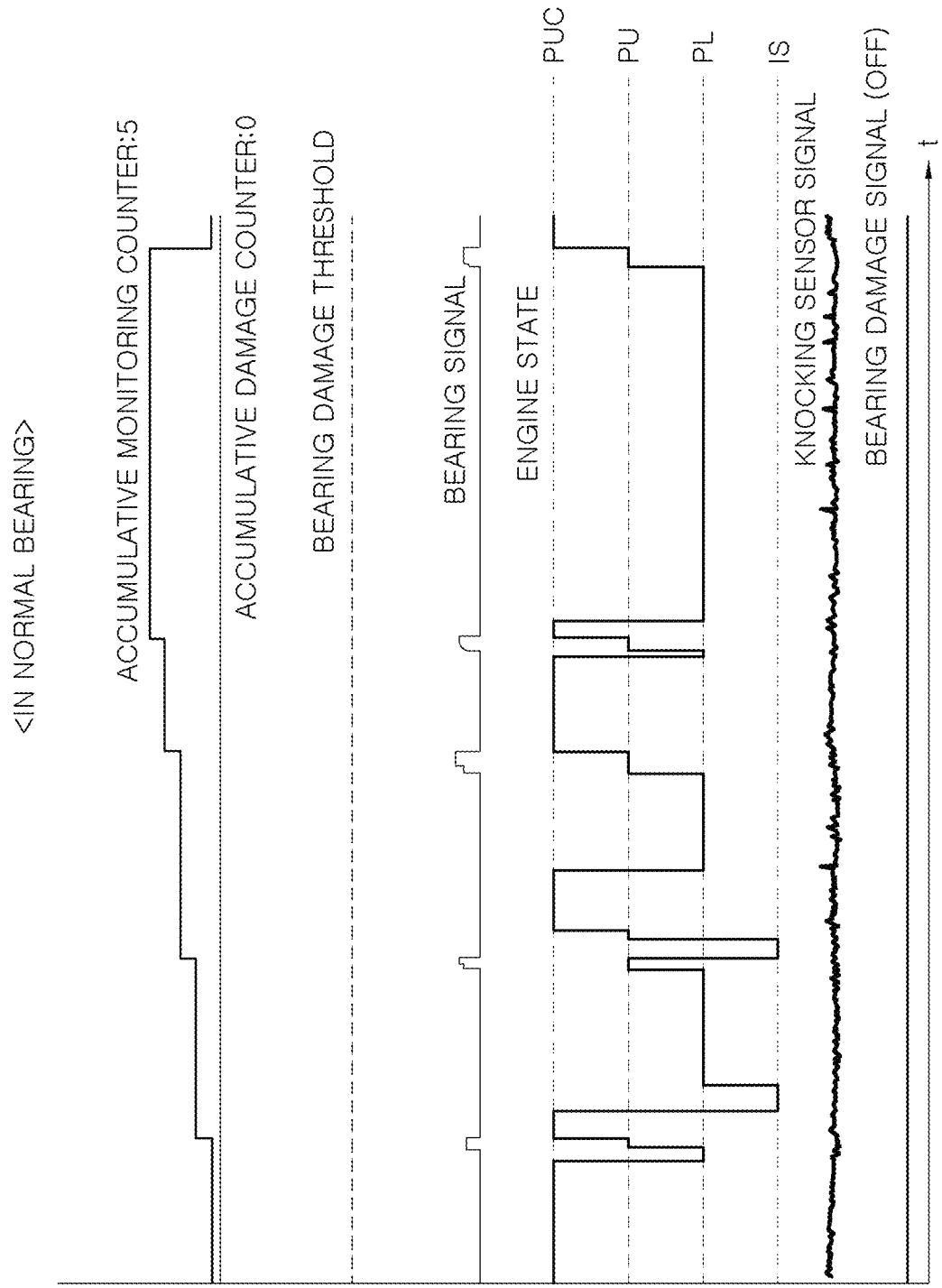
FIG. 8B is a graph showing a state of the engine at the initial deceleration and a state of a knocking sensor in the normal engine.

Firstly, FIGS. 8A, 8B, and 8C show a procedure in which the engine 10 determines a variation of the load acting on the bearing 13 in the initial deceleration and the damage for the cases where the bearing 13 is normal and has been damaged.

When the bearing 13 is normal, the engine 10 operates by passing through deceleration accompanied by a fuel cut (PUC), deceleration not accompanied by the fuel cut (PU), a partial load (PL), an idle (IS) state, etc. when the vehicle travels. When it is a state where the bearing 13 has not been damaged (see FIG. 8B), the monitoring counter also increases by one every time the engine 10 is sensed as the state (PU) that starts deceleration in the determining the engine state S140. At the same time, the bearing signal also increases due to a change in the bearing load at the deceleration start timing, but the damage counter does not increase because the magnitude of the bearing signal falls below a bearing damage threshold.

Meanwhile, in the state where the bearing has been damaged (see FIG. 8C), the monitoring counter increases by one S150 every time the engine 10 enters the deceleration state (PU) S140. At the same time, when comparing its magnitude as a state where the bearing signal has been increased due to a change in the bearing load with the bearing damage threshold S160, the bearing signal exceeds the bearing damage threshold. Every time the bearing signal exceeds the bearing damage threshold, the damage counter is increased S170, and the damage counter is accumulated. In the state where the bearing has been damaged as compared to the state where the bearing is normal, discriminative noise and vibration occur when the load of the bearing is rapidly reduced at the timing at which the vehicle starts deceleration, thereby sensing it and accumulating the sensed number of times.

In FIG. 8C, the monitoring counter and the damage counter are accumulated so that the damage counter is accumulated to 3 (accumulative damage counter=3) while the monitoring counter is accumulated to 5 (damage determination accumulative monitoring counter=5) to become a predetermined threshold (damage confirmation accumulative damage counter) or more, such that it is confirmed that the bearing 13 has been damaged S180.

As described above, when the damage of the bearing is confirmed at the initial deceleration S180, any one of the limp home mode S191 and the operating the warning means S192 is performed or both the limp home mode S191 and the operating the warning means S192 are performed.

In addition, the above mentioned procedure may be confirmed in the same way at the initial deceleration in a fuel cut state.

Figure 9A:
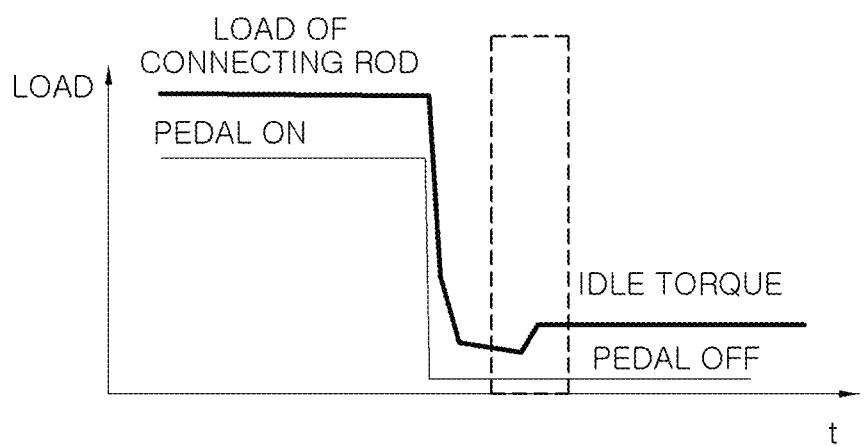
FIG. 9A is a graph showing a variation of the load of the connecting rod upon entering an idle during deceleration in the engine.
Figure 9B:
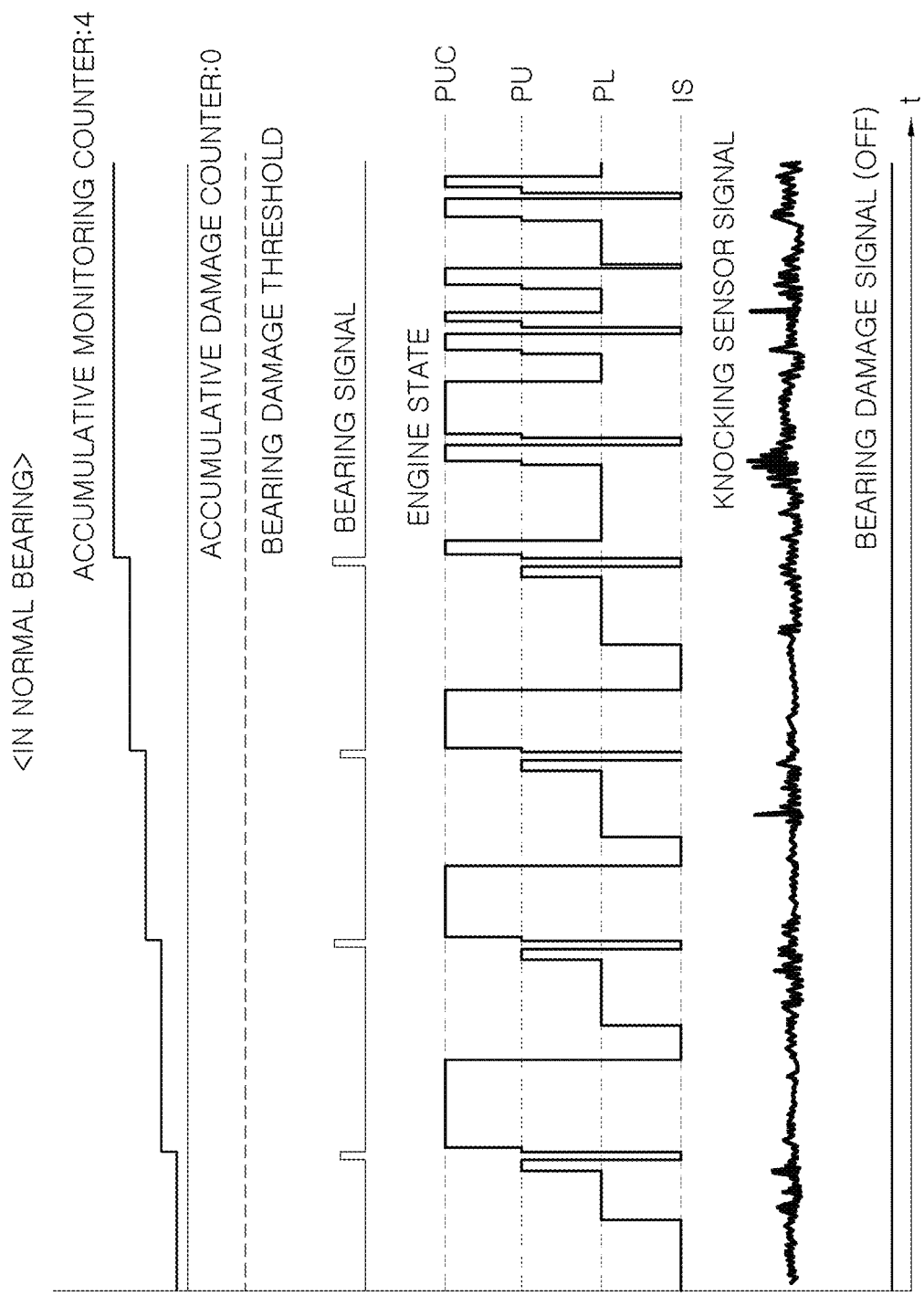
FIG. 9B is a graph showing a state of the engine upon entering the idle during deceleration and a state of the knocking sensor in the normal engine.
Figure 9C:
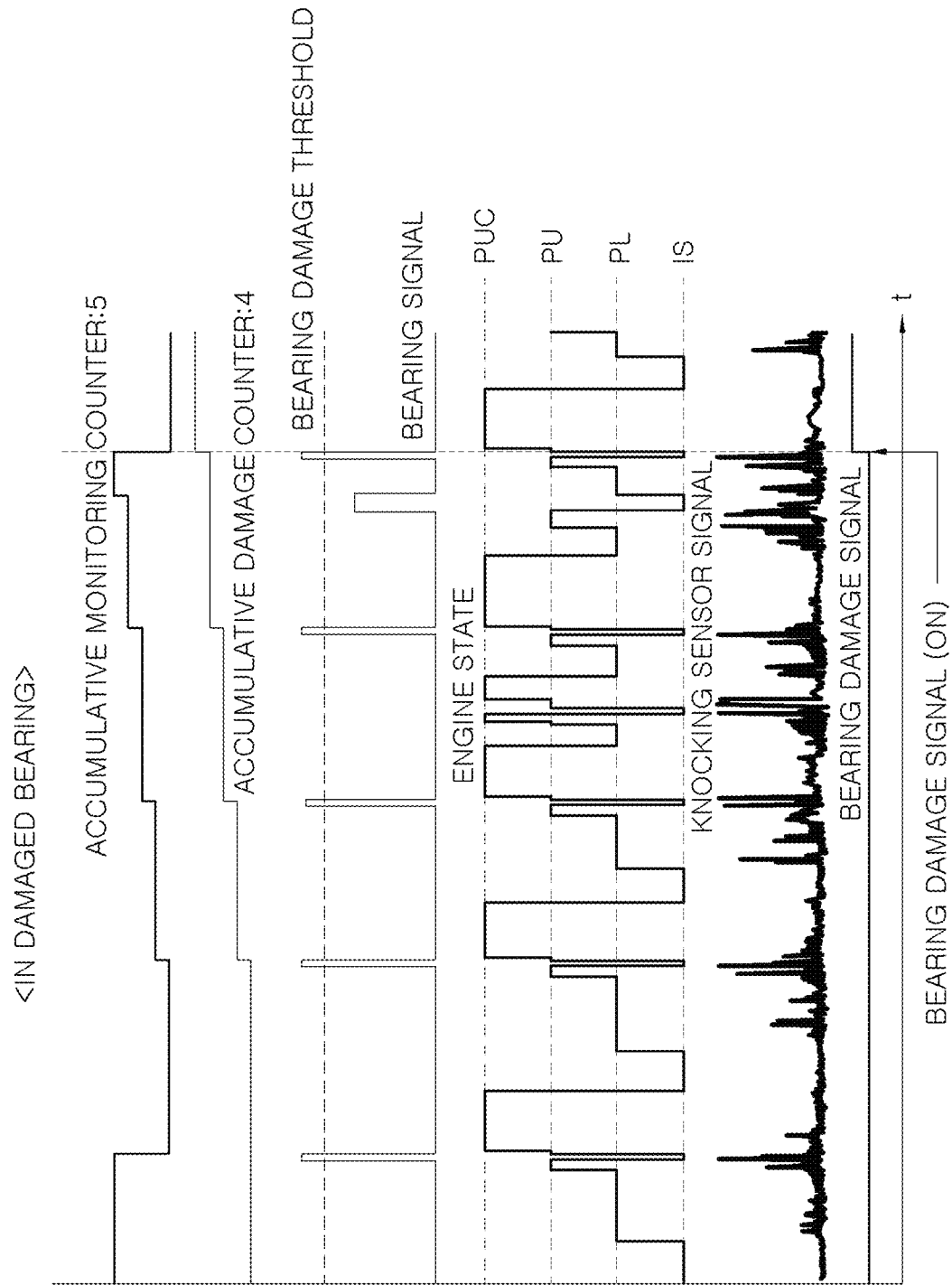
FIG. 9C is a graph showing a state of the engine upon entering the idle during deceleration and a state of the knocking sensor in the engine with the bearing damaged.

FIGS. 9A, 9B, and 9C show a procedure of determining a variation of the load acting on the connecting rod 11, and the damage for cases where the bearing 13 is normal or has been damaged. The variation of the load occurs in order to change the RPM of the engine 10 to the RPM in the idle while the engine 10 enters the idle during deceleration, and in the state where the bearing has been damaged as compared to the state where the bearing is normal, a relatively large vibration occurs at the load variation timing, thereby sensing it to determine the damage of the bearing.

When the bearing 13 is normal, the engine 10 operates by passing through the deceleration accompanied by the fuel cut (PUC), the deceleration not accompanied by the fuel cut (PU), the partial load (PL), the idle (IS) state, etc. when the vehicle travels. When the bearing 13 is not damaged (see FIG. 9B), the monitoring counter also increases by one every time the engine 10 is sensed as the state entering the idle during deceleration (PU→IS) in the determining the engine state S140. At the same time, when entering the idle during deceleration (PU→IS), the bearing signal also increases due to the change in the bearing load, but the damage counter does not increase because the magnitude of the bearing signal falls below the bearing damage threshold.

However, when the engine 10 is sensed as the state entering the idle during deceleration (PU→IS) during operation in the state where the bearing 13 has been damaged S140, the monitoring counter also increases by one S150. If the engine 10 enters the idle during deceleration (PU→IS) in the state where the bearing 13 has been damaged, the vibration occurring from a portion where the bearing 13 has been installed is greater than that in the normal case because the clearance is increased due to the damage of the bearing 13, thereby increasing the damage counter S170 and accumulating it every time the signal of the bearing exceeds the bearing damage threshold.

When the accumulative damage counter exceeds '2' that is the predetermined damage confirmation accumulative damage counter while the damage determination accumulative monitoring counter for the accumulative monitoring counter confirming the damage of the bearing is accumulated to '5', it is confirmed that the bearing 13 has been damaged S180. In FIG. 9C, the reason for confirming the damage of the bearing when the accumulative amount of the damage counter (accumulative damage counter) becomes '4' rather than when becoming '3' is because the accumulative monitoring counter becomes 5, which has been set as the damage determination accumulative monitoring counter.

As described above, when the damage of the bearing 13 is confirmed by sensing the damage of the bearing while entering the idle during deceleration (PU→IS) S180, likewise, any one of the limp home mode S191 and the operating the warning means S192 is performed, or both the limp home mode S191 and the operating the warning means S192 are performed.

In addition, the above mentioned procedure may be confirmed in the same way at the initial deceleration in a fuel cut state.

Figure 10A:
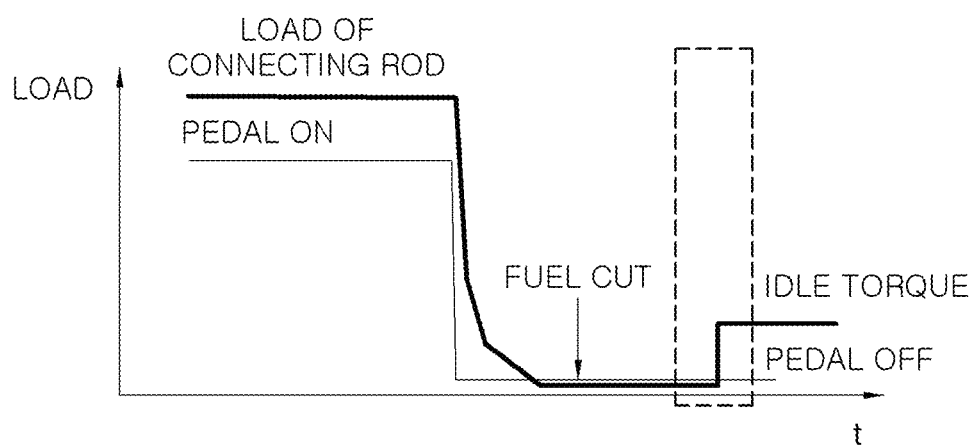
FIG. 10A is a graph showing a variation of the load of the connecting rod upon entering an idle in a fuel cut state during deceleration in the engine.
Figure 10B:
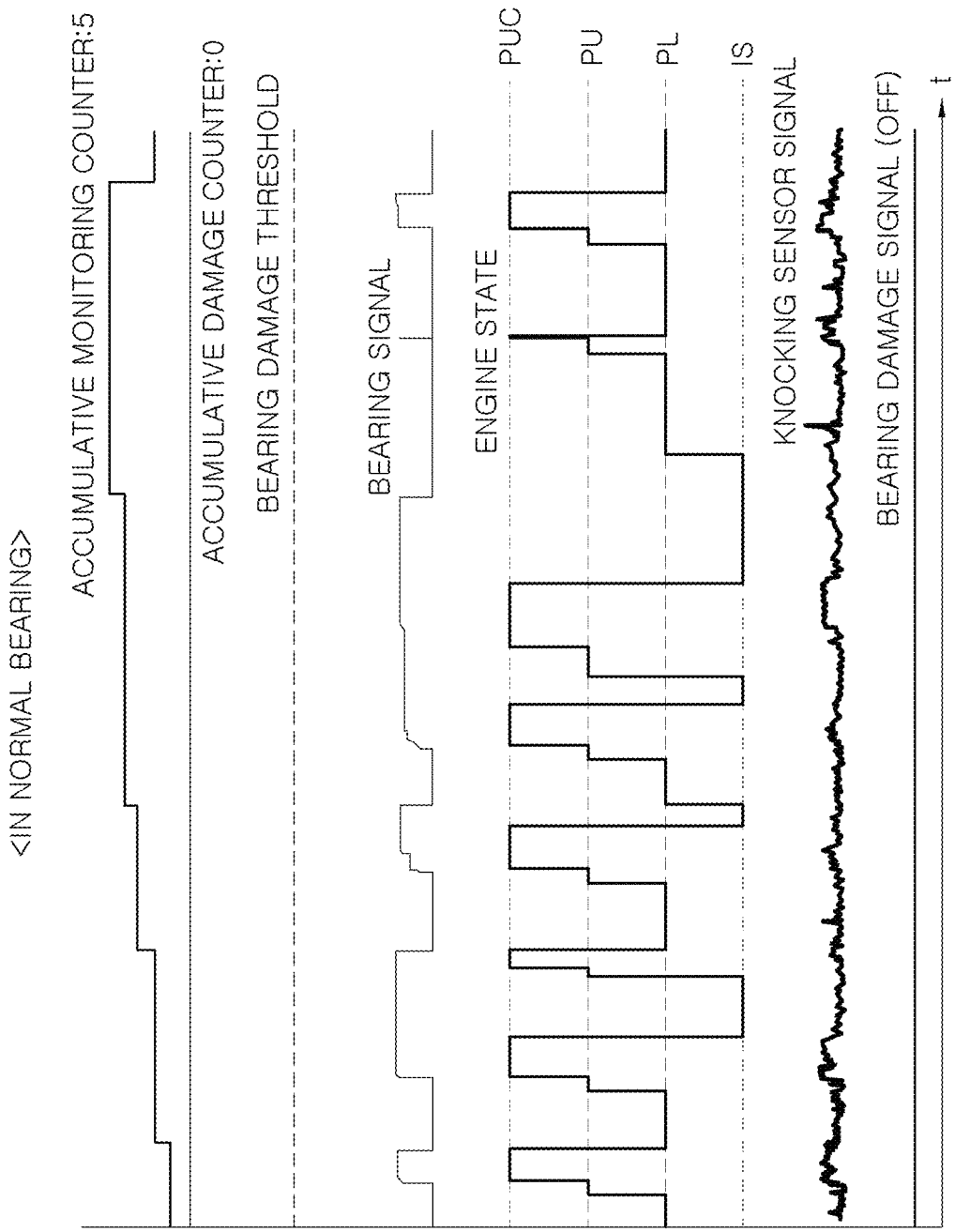
FIG. 10B is a graph showing a state of the engine upon entering the idle in the fuel cut state during deceleration and a state of the knocking sensor in the normal engine.
Figure 10C:
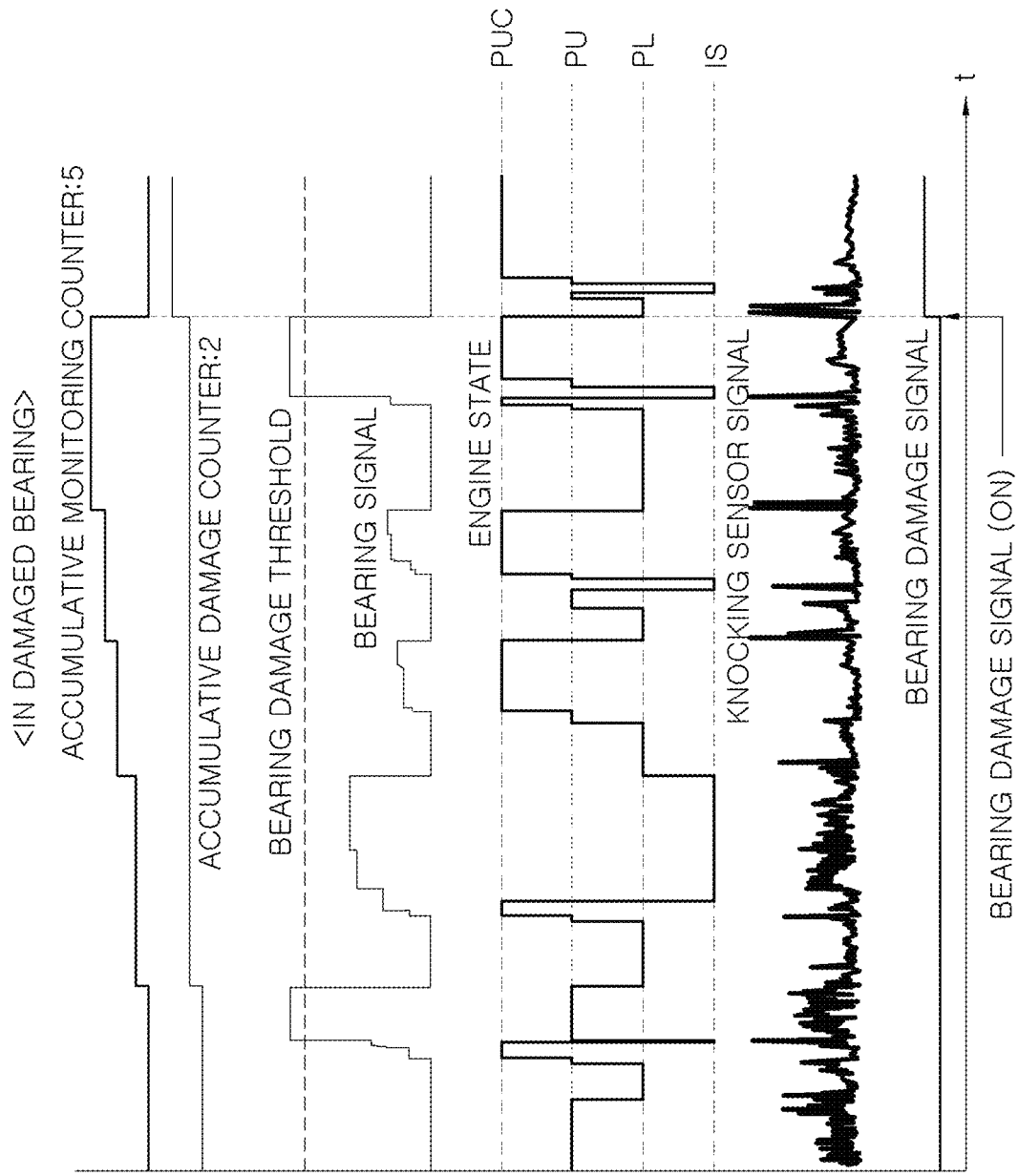
FIG. 10C is a graph showing a state of the engine upon entering the idle in the fuel cut state during deceleration and a state of the knocking sensor in the engine with the bearing damaged.

Meanwhile, FIGS. 10A, 10B and 10C show a procedure of determining a variation of the load acting on the connecting rod 11, and the damage for cases where the bearing 13 is normal or has been damaged, while entering the idle in the fuel cut state during deceleration. When the engine 10 enters the idle in the fuel cut state during deceleration, the engine 10 restarts combustion in order to change the RPM from the fuel cut state during deceleration to the idle, thereby occurring a variation of the load, and at this time, when the bearing has been damaged, the discriminative vibration occurs as compared to the normal case, thereby sensing the damage of the bearing 13 by using it.

When the bearing 13 is normal, the engine 10 operates by passing through the deceleration accompanied by the fuel cut (PUC), the deceleration not accompanied by the fuel cut (PU), the partial load (PL), the idle (IS) state, etc. when the vehicle travels. When the bearing 13 has not been damaged (see FIG. 10B), the monitoring counter also increase by one every time the engine 10 is sensed as the state entering the idle in the fuel cut state during deceleration (PUC→IS) in the determining the engine state S140. At the same time, when entering the idle in the fuel cut state during deceleration (PUC→IS), the bearing signal changes due to the change in the bearing load. Although the magnitude of the bearing signal is greater than that of the above-described embodiments shown in FIGS. 8B and 9B, the magnitude of the bearing signal falls below the bearing damage threshold even in FIG. 10B, thereby continuously monitoring the state of the bearing without increasing the damage counter.

However, when the engine 10 is sensed as the state entering the idle in the fuel cut state during deceleration (PUC→IS) during operation in the state where the bearing 13 has been damaged S140, the monitoring counter also increases by one S150. In the state where the bearing 13 has been damaged, when the engine 10 enters the idle in the fuel cut state during deceleration (PUC→IS), the vibration occurring from the portion where the bearing 13 has been installed is sensed greater than that of the normal case because the clearance is increased due to the damage of the bearing 13. At this time, some of the bearing signals exceed the bearing damage threshold, and the remainder does not exceed the bearing damage threshold. Every time the engine enters the idle in the fuel cut state during deceleration (PUC→IS) S140, the monitoring counter is increased S150, and the damage counter is increased every time the bearing signal exceeds the bearing damage threshold S160.

When the accumulative damage counter is the predetermined threshold (damage confirmation accumulative damage counter='2') or more while the accumulative monitoring counter is the damage determination accumulative monitoring counter ('5'), it is confirmed that the bearing 13 has been damaged S180.

As described above, when the damage of the bearing 13 is confirmed by sensing the damage of the bearing (PUC→IS) every time entering the idle in the fuel cut state during deceleration, likewise, any one of the limp home mode S191 and the operating the warning means S192 is performed or both of them are performed.

Figure 11A:
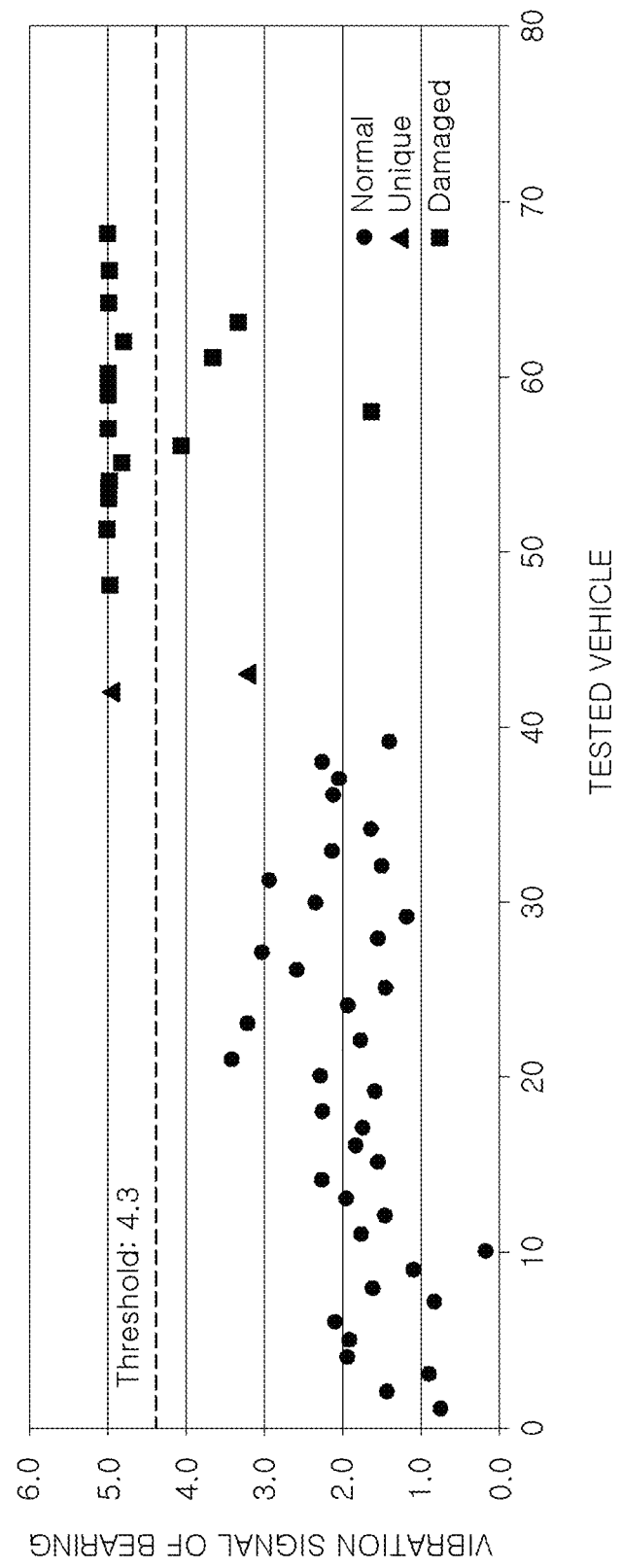
FIG. 11A is a graph showing a bearing damage threshold according to each operation condition in the method for sensing damage of the bearing of the engine using the vibration signal in one form of the present disclosure.
Figure 11C:
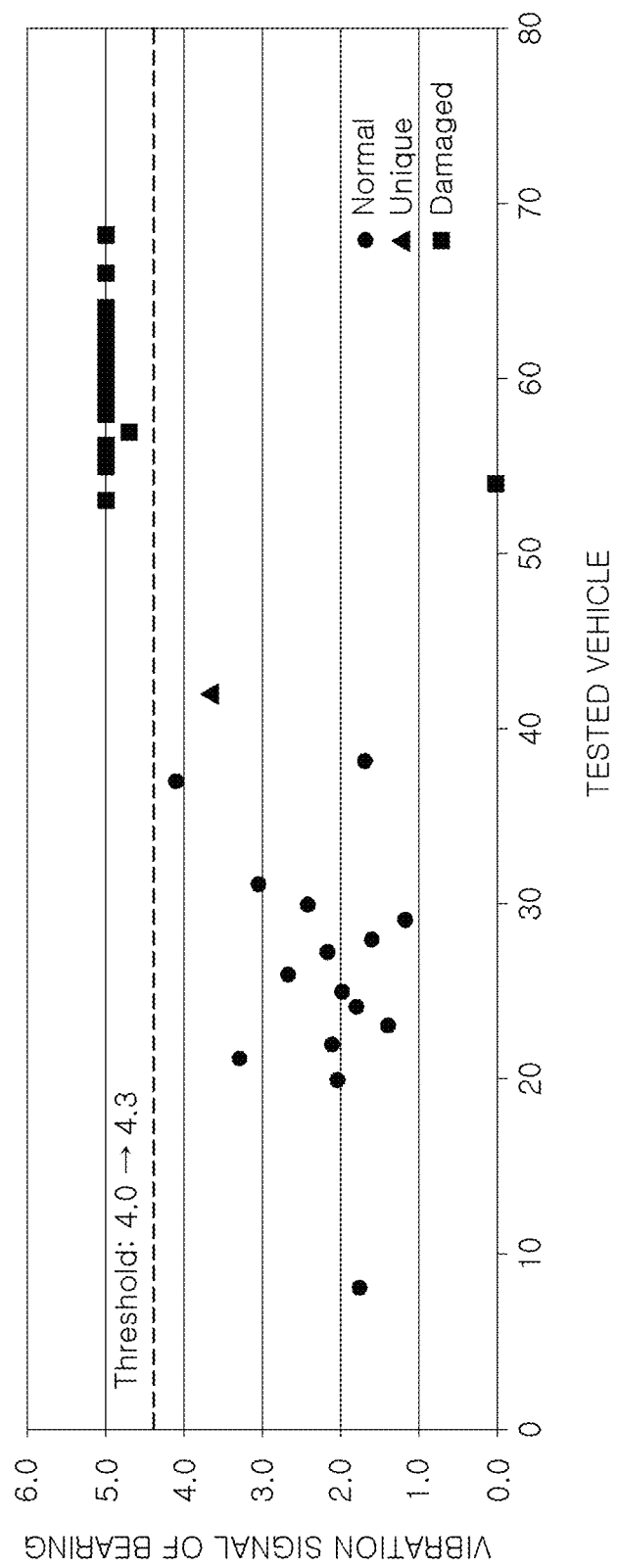
FIG. 11C is a graph showing a bearing damage threshold according to each operation condition in the method for sensing damage of the bearing of the engine using the vibration signal in one form of the present disclosure.

FIGS. 11A to 11C show an example of a bearing damage threshold for determining the damage of the bearing according to the operation state of the engine 10 from the signal generated from the bearing. FIG. 11A is an example of setting the bearing damage threshold in the state where the engine is in the initial deceleration state (PU), FIG. 11B is an example of setting the bearing damage threshold in the state where the engine enters the idle during deceleration (PU→IS), and FIG. 11C is an example of setting the bearing damage threshold in the state where the engine enters the idle in the fuel cut state during deceleration (PUC→IS).

When viewing each drawing, the distribution of the vibration signal is relatively concentrated at the bearing damage threshold or more in the normal case, while there are many cases of exceeding the bearing damage threshold and the distribution thereof is also dispersed in the state where the bearing has been damaged.

In addition, the bearing damage threshold is also set differently according to the operation state of the engine 10. This is because the levels of the bearing signals measured from the knocking sensor 15 are different according to the respective engine operation states, such that the appropriate bearing damage threshold is different according to the respective engine operation states. FIGS. 11A to 11C show an example of the bearing damage threshold in the operation state of each engine, and the bearing damage threshold can be appropriately changed to a different value.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for sensing damage of a bearing of an engine using a vibration signal, comprising:
   separating the vibration signal of the engine sensed by a vibration sensor installed at one side of the engine of a vehicle into a vibration signal by combustion knocking and a vibration signal of the bearing installed between a crank pin and a connecting rod;
   extracting, by a signal processing filter, a signal of a predetermined natural frequency band from the vibration signal of the bearing;
   determining whether the extracted signal is higher than a predetermined bearing damage threshold in a predetermined engine state condition in order to sense damage of the bearing during an operation of the engine; and
   confirming that the bearing has been damaged,
   wherein the vibration signal of the bearing is mutually distinguished from the vibration signal by combustion knocking based on the predetermined engine state condition or a rotation angle of a crankshaft.

2. The method of claim 1, wherein the method comprises:
   receiving the vibration signal of the bearing from a predetermined sensing section of the rotation angle of the crankshaft.

3. The method of claim 2, wherein the method comprises:
   setting the predetermined sensing section for each cylinder within a predetermined range of an angle before and after a top dead center (TDC).

4. The method of claim 2, wherein the method comprises:
   setting the predetermined sensing section separately for the each cylinder based on the rotation angle of the crankshaft.

5. The method of claim 1, wherein the predetermined engine state condition comprises:
   at least one of a state where the engine enters an initial deceleration state that starts a deceleration or a state where the engine enters an idle state during the deceleration.

6. The method of claim 5, wherein the state where the engine enters the idle state during the deceleration comprises:
   a state where the engine enters the idle state in a fuel cut state during the deceleration; and a state where the engine enters the idle state without the fuel cut state during the deceleration.

7. The method of claim 5, wherein the method comprises:
   increasing a monitoring counter for each engine state condition;
   increasing a damage counter when the extracted signal is higher than the predetermined bearing damage threshold; and
   confirming the damage of the bearing when the increased monitoring counter is less than or equal to a predetermined damage determination accumulative monitoring counter.

8. The method of claim 1, wherein the method further comprises:
   reducing, by the engine, a RPM of the engine to a predetermined safety maximum engine RPM or below; and
   when the bearing is damaged, notifying a passenger of the damage of the bearing by operating an alarm installed in the vehicle.

9. The method of claim 1, wherein the method further comprises processing the separated vibration signal by:
   setting 1.5 kHz to 2.5 kHz as a center frequency from the vibration signal of the bearing;
   setting a frequency band within a predetermined frequency band as a natural frequency band; and
   removing a signal that is not within the natural frequency band.

10. A method for sensing damage of a bearing of an engine using a vibration signal, comprising:
    separating the vibration signal of the engine sensed by a vibration sensor installed at one side of the engine of a vehicle into a vibration signal by combustion knocking and a vibration signal of the bearing installed between a crank pin and a connecting rod;
    extracting, by a signal processing filter, a signal of a predetermined natural frequency band from the vibration signal of the bearing;
    increasing a damage counter when the extracted signal is higher than a predetermined bearing damage threshold in order to sense damage of the bearing during an operation of the engine, wherein the damage counter increase is based upon a predetermined engine state condition; and
    confirming the damage of the bearing when the increased monitoring counter is less than or equal to a predetermined damage determination accumulative monitoring counter.

11. The method of claim 10, wherein the predetermined engine state condition comprises:
    at least one of a state where the engine enters an initial deceleration state that starts a deceleration, a state where the engine enters an idle state during the deceleration, or a state where the engine enters the idle state in a fuel cut state during the deceleration.

12. The method of claim 11, wherein the method further comprises:
    increasing a monitoring counter for the each engine state condition; and
    confirming the damage of the bearing when the increased monitoring counter is less than or equal to the predetermined damage determination accumulative monitoring counter.

13. The method of claim 10, wherein the method further comprises processing the separated vibration signal by:
    setting 1.5 kHz to 2.5 kHz as a central frequency from the vibration signal of the bearing;
    setting a frequency band within a predetermined frequency band as a natural frequency band; and
    removing a signal that is not within the natural frequency band.

14. A method for sensing damage of a bearing of an engine using a vibration signal, comprising:
    separating the vibration signal of the engine sensed by a vibration sensor installed at one side of the engine of a vehicle into a vibration signal by combustion knocking and a vibration signal of the bearing installed between a crank pin and a connecting rod;
    extracting, by a signal processing filter, a signal of a predetermined natural frequency band from the vibration signal of the bearing;

determining whether the extracted signal is higher than a predetermined bearing damage threshold in a predetermined engine state condition in order to sense damage of the bearing during an operation of the engine; and confirming that the bearing has been damaged, wherein the vibration signal of the bearing is sensed in a predetermined sensing section of a rotation angle of a crankshaft.

15. The method of claim 14, wherein the method comprises:

setting the predetermined sensing section separately for each cylinder based on the rotation angle of the crankshaft.

16. The method of claim 15, wherein the method comprises:

forming the predetermined sensing section in a predetermined range of the rotation angle from an ignition timing of the each cylinder.

17. The method of claim 15, wherein the method comprises:

setting the predetermined sensing section in the predetermined range of the rotation angle before and after a top dead center (TDC) of the each cylinder.

18. The method of claim 14, wherein the method further comprises:

increasing a monitoring counter for each engine state condition; and increasing a damage counter when the extracted signal is higher than the predetermined bearing damage threshold.

19. The method of claim 14, wherein the method comprises:

confirming the damage of the bearing when the increased monitoring counter is less than or equal to a predetermined damage determination accumulative monitoring counter.

20. The method of claim 14, wherein the method further comprises processing the separated vibration signal by:

setting 1.5 kHz to 2.5 kHz as a center frequency from the vibration signal of the bearing;

setting a frequency band within a predetermined frequency band as a natural frequency band; and removing a signal that is not within the natural frequency band.

* * * * *